(12) United States Patent
Eddaoudi et al.

(10) Patent No.: US 10,864,479 B2
(45) Date of Patent: *Dec. 15, 2020

(54) ZEOLITE-LIKE METAL-ORGANIC FRAMEWORK MEMBRANE

(71) Applicant: King Abdullah University of Science and Technology, Thuwal (SA)

(72) Inventors: Mohamed Eddaoudi, Thuwal (SA); Bassem A. Almaythalony, Thuwal (SA); Osama Shekhah, Thuwal (SA); Youssef Belmabkhout, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 129 days.

This patent is subject to a terminal disclaimer.

(21) Appl. No.: 16/159,903

(22) Filed: Oct. 15, 2018

(65) Prior Publication Data
US 2019/0046923 A1 Feb. 14, 2019

Related U.S. Application Data

(63) Continuation of application No. 15/100,513, filed as application No. PCT/US2014/067678 on Nov. 26, 2014, now Pat. No. 10,130,908.
(Continued)

(51) Int. Cl.
| | |
|---|---|
| *B01D 53/22* | (2006.01) |
| *B01D 69/02* | (2006.01) |
| *B01D 53/28* | (2006.01) |
| *B01D 67/00* | (2006.01) |
| *B01D 69/10* | (2006.01) |
| *B01D 71/02* | (2006.01) |

(52) U.S. Cl.
CPC .......... *B01D 53/228* (2013.01); *B01D 53/28* (2013.01); *B01D 67/0051* (2013.01); *B01D 69/02* (2013.01); *B01D 69/10* (2013.01); *B01D 71/028* (2013.01); *B01D 2257/504* (2013.01); *B01D 2325/14* (2013.01); *Y02C 10/10* (2013.01)

(58) Field of Classification Search
CPC .. B01D 53/228; B01D 53/28; B01D 67/0051; B01D 69/02; B01D 69/10; B01D 71/028; B01D 2257/504; B01D 2325/14
See application file for complete search history.

(56) References Cited

U.S. PATENT DOCUMENTS

| | | | |
|---|---|---|---|
| 8,415,493 B2 | 4/2013 | Eddaoudi | |
| 10,130,908 B2 * | 11/2018 | Eddaoudi | ............... B01D 69/02 |

(Continued)

FOREIGN PATENT DOCUMENTS

| | | |
|---|---|---|
| CN | 102652035 A | 8/2012 |
| CN | 103068474 A | 4/2013 |

(Continued)

OTHER PUBLICATIONS

"International Search Report and Written Opinion", International Application No. PCT/US20141067678 dated Mar. 25, 2015, 13 pages.

(Continued)

*Primary Examiner* — Jason M Greene
(74) *Attorney, Agent, or Firm* — Billion & Armitage; Gregory S. Schwartz

(57) ABSTRACT

Metal organic framework membranes can be used in gas separation applications.

20 Claims, 17 Drawing Sheets

Related U.S. Application Data

(60) Provisional application No. 61/910,152, filed on Nov. 29, 2013.

(56) References Cited

U.S. PATENT DOCUMENTS

| | | | |
|---|---|---|---|
| 2006/0287190 | A1 | 12/2006 | Eddaoudi et al. |
| 2009/0015546 | A1 | 1/2009 | Choi et al. |
| 2009/0155464 | A1 | 6/2009 | Liu et al. |
| 2009/0169857 | A1 | 7/2009 | Fischer |
| 2010/0069234 | A1 | 3/2010 | Willis |
| 2011/0138999 | A1 | 6/2011 | Willis |
| 2012/0297982 | A1 | 11/2012 | Dinca |
| 2013/0047843 | A1 | 2/2013 | Matteucci et al. |
| 2013/0313193 | A1 | 11/2013 | Nair et al. |
| 2015/0246318 | A1 | 9/2015 | Jeong |

FOREIGN PATENT DOCUMENTS

| | | |
|---|---|---|
| WO | 2005113121 | 12/2005 |
| WO | 2005113121 A1 | 12/2005 |
| WO | 2011081779 A2 | 7/2011 |
| WO | 2011100501 A1 | 8/2011 |
| WO | 2012122233 | 9/2012 |
| WO | 2012122233 A2 | 9/2012 |
| WO | 2012138750 A | 10/2012 |
| WO | 2012138750 A2 | 10/2012 |

OTHER PUBLICATIONS

Aguado, et al., "Facile synthesis of an ultramicroporous MOF tubular membrane with selectivity towards CO2", New J. Chem., 2011, 35, 41-44.
Baker, "Membrane Technology and Applications", Wiley, 2012.
Betard, et al., "Metal-Organic Framework Thin Films: From Fundamentals to Applications.", Chemical Reviews, 2012, 112, 1055-1083.
Bohrman, et al., "Synthesis and CO2/CH4 separation performance of Bio-MOF-1 membranes", Chem. Commun., 2012, 48, 5130-5132, Dec. 1, 2012, 49 pages.
Bux, et al., "Oriented Zeolitic Imidazolate Framework-8 Membrane with Sharp H2/C3H8 Molecular Sieve Separation", Chemistry of Materials, 2011, 23, 2262-2269.
Bux, et al., "Zeolitic Imidazolate Framework Membrane with Molecular Sieving Properties by Microwave-Assisted Solvothermal Synthesis", J. Am. Chem. Soc. 2009, 131, 16000-16001.
Chen, et al., "Carbon dioxide adsorption over zeolite-like metal organic frameworks (ZMOFs) having a sod topology: Structure and ion-exchange effect", Chemical Engineering Journal, 168,, 2011, 1134-1139.
Chen, "Examining the Accuracy of Ideal Adsorbed Solution Theory without Curve-Fitting Using Transition Matrix Monte Carlo Simulations", Langmuir, 2007, 23, 6431-6437.
Chung, et al., "Mixed matrix membranes (MMMs) comprising organic polymers with dispersed inorganic fillers for gas separation", Progress in Polymer Science, 2007, 32, 483-507.
Czichos, et al., "Springer handbook of materials measurement methods", vol. 978, Springer, 2006.
Demir, et al., "CO2/CH4 Separation in Ion-Exchanged Zeolite-like Metal Organic Frameworks with Sodalite Topology (sod-ZMOFs)", Journal of Physical Chemistry C., vol. 117, No. 30, Aug. 1, 2013, 15647-15658.
Eddaoudi, et al., "Highly Porous and Stable Metal-Organic Frameworks: Structure Design and Sorption Properties", J. Am. Chem. Soc. 2000, 122, 1391-1397.
Eubank, et al., "The Quest for Modular Nanocages: tbo-MOF as an Archetype for Mutual Substitution, Functionalization, and Expansion of Quadrangular Pillar Building Blocks", J. Am. Chem. Soc. 2011, 133, 14204-14207.
Ferey, et al., "Hybrid porous solids: past, present, future", Chemical Society Reviews, 2008, 37, 191-214.
Freemantle, "Membranes for Gas Separation", Chem. Eng. News 2005, 83, 3.
Huang, et al., "Covalent Post-Functionalization of Zeolitic Imidazolate Framework ZIF-90 Membrane for Enhanced Hydrogen Selectivity", Angewandte Chemie Int. Ed., 2011, 50, 4979-4982.
Huang, et al., "Molecular-Sieve Membrane with Hydrogen Permselectivity: ZIF-22 in LTA Topology Prepared with 3-Aminopropyltriethoxysilane as Covalent Linker", Angewalte Chemie Int. Ed., 2010, 49, 4958-4961.
Huang, et al., "Organosilica-Functionalized Zeolitic Imidazolate Framework ZIF-90 Membrane with High Gas-Separation Performance", Chem. Int. Ed. 2012, 51, 1-6.
Huang, et al., "Steam-Stable Zeolitic Imidazolate Framework ZIF-90 Membrane with Hydrogen Selectivity through Covalent Functionalization", J. Am. Chem. Soc., 2010, 132, 15562-15564.
Kitagawa, "Functional Porous Coordination Polymers", Angewalte Chemie Int. Ed., 2004, 43, 2334-2375.
Koros, et al., "Membrane-based gas separation", Journal of Membrane Science, 1993, 83, 1-80.
Kuppler, et al., "Potential applications of metal-organic frameworks", Coordination Chemistry Reviews, 2009, 253, 3042-3066, 2009, 3042-3066.
Li, et al., "Controllable Synthesis of Metal-Organic Frameworks: From MOF Nanorods to Oriented MOF Membranes", Advanced Materials, 2010, 22, 3322-3324.
Li, et al., "Metal-Organic Frameworks for Separations", Chem. Rev., 2012, 112, 869-932.
Li, et al., "Selective gas adsorption and separation in metal-organic frameworks", Chem. Soc. Rev., 2009, 38, 1477-1504.
Li, et al., "Zeolitic imidazolate framework ZIF-7 based molecular sieve membrane for hydrogen separation", Journal of Membrane Science, 2010, 354, 48-54.
Liu, et al., "Molecular building blocks approach to the assembly of zeolite-like metal-organic frameworks (ZMOFs) with extra-large cavities", Chemical Communications—CHEMCOM, vol. 2006, No. 14, Feb. 2, 2006, 1488-1490.
Liu, et al., "Molecular building blocks approach to the assembly of zeolite-like metal-organic frameworks (ZMOFs) with extra-large cavities", Chem. Commun., vol. 2006, No. 14,, 2006, 1488-1490.
Myers, et al., "Thermodynamics of Mixed-Gas Adsorption", AlChE 1965, 11, 121-127.
Nugent, et al., "Porous materials with optimal adsorption thermodynamics and kinetics for CO2 separation", Nature, , 495, Feb. 27, 2013, 80-84.
Shah, et al., "Current Status of Metal-Organic Framework Membranes for Gas Separations: Promises and Challenges", Ind. & Eng. Chem. Res. 2012, 51, 2179-2199.
Shekhah, et al., "MOF thin films: existing and future applications", Chem. Soc. Rev. 2011, 40, 1081-1106.
Takamizawa, et al., "Single-Crystal Membrane for Anisotropic and Efficient Gas Permeation", Journal of the American Chemical Society 2010 132 (9), 2862-2863.
Venna, et al., "Highly Permeable Zeolite Imidazolate Framework-8 Membranes for CO2/CH4 Separation", J. Am. Chem. Soc. 2009, 132, 76-78.
Xiang, et al., "M icroporous metal-organic framework with potential for carbon dioxide capture at ambient conditions", Nature Communications, 2012, 3, 954.
Yampolskii, et al., "Materials Science of Membranes for Gas and Vapor Separation", Wiley, 2006.

\* cited by examiner

ZEOLITE-LIKE METAL-ORGANIC FRAMEWORK MEMBRANE

PRIORITY CLAIM

This application is a continuation of U.S. application Ser. No. 15/100,513, filed on May 31, 2016, which is a National Stage Application of International Application No. PCT/US2014/067678, filed on Nov. 26, 2014, which application claims priority to U.S. Provisional Application No. 61/910,152, filed on Nov. 29, 2013, which applications are incorporated by reference in their entirety.

TECHNICAL FIELD

The invention features metal-organic framework materials.

BACKGROUND

Metal-organic framework materials can be constructed to have a variety of material properties.

SUMMARY

In one aspect, a thin film membrane can include a zeolite-like metal-organic framework, wherein the thin film membrane has a selectivity for $CO_2$ over $H_2$. The thin film membrane can be anionic. The thin film membrane can have a zeolite-like structure, for example, a structure having a sodalite topology. The thin film membrane can be on a support, which can be a porous ceramic substrate, for example, a porous alumina substrate.

In another aspect, a method of separating gases can include passing a mixture of gasses through a thin film membrane comprising a zeolite-like metal-organic framework, wherein the thin film membrane has a selectivity for $CO_2$ over $H_2$.

In certain embodiments, the permeance of the thin film membrane can be higher for $CO_2$ than for other gases. The permeance of the thin film membrane can be higher for $CO_2$ than for $CH_4$. The thin film membrane can have a separation factor of at least 3 for $CO_2$ over $CH_4$. The permeance of the thin film membrane can be higher for $CO_2$ than for $H_2$. The thin film membrane can have a selectivity of at least 4 for $CO_2$ over $H_2$. The permeance of the thin film membrane can be higher for $CO_2$ than for $N_2$. The thin film membrane can have a separation factor of at least 6 for $CO_2$ over $N_2$. The permeance of the thin film membrane can be higher for $CO_2$ than for $O_2$. The thin film membrane can have a separation factor of at least 4 for $CO_2$ over $O_2$.

In certain embodiments, the thickness of the thin-film membrane can be between 20 and 100 μm. The thin film membrane can have a high degree of crystallinity. The zeolite-like metal-organic framework can include a linker and a metal. The metal can include a metal, such as a transition metal, group 13 metal or a lanthanide metal, for example, Indium, Yttrium, or Cadmium, or a combination thereof. The linker can include a heteroaromatic group, such as a nitrogen-containing heteroaromatic group, for example, imidazole or pyrimidine moiety.

In another aspect, a method for preparing a zeolite-like metal-organic framework membrane can include contacting a substrate with a solution mixture of carboxylic acid, an imidazole, a metal salt, and a nitric acid to form a zeolite-like metal-organic framework membrane. The method can include exchanging a cation of the ZMOF to provide a modified ZMOF.

In certain embodiments, the zeolite-like metal-organic framework membrane can be anionic. The zeolite-like metal-organic framework membrane can have a sodalite topology. The zeolite-like metal-organic framework membrane can have a selectivity for $CO_2$ over $H_2$, $N_2$, $O_2$, or $CH_4$. In certain embodiments, the film membrane can separate hydrocarbons by size or shape.

In certain embodiments, the method can include activating the substrate. The method can include heating the reagent while contacting with the substrate. The method can include contacting the substrate with acetonitrile after contacting with the reagent. The method can include modifying the zeolite-like metal-organic framework membrane through cation exchange with, for example, an alkali metal ion or alkaline earth metal ion, for example, $Li^+$, $Na^+$, $K^+$, or $Mg^{2+}$.

In certain embodiments, the zeolite-like metal-organic framework can include a linker and a metal. The metal can include a transition metal, group 13 metal, for example, Indium, Yttrium, or Cadmium, or a combination thereof.

Other aspects, embodiments, and features will be apparent from the following description, the drawings, and the claims.

DETAILED DESCRIPTION

Figure 1:
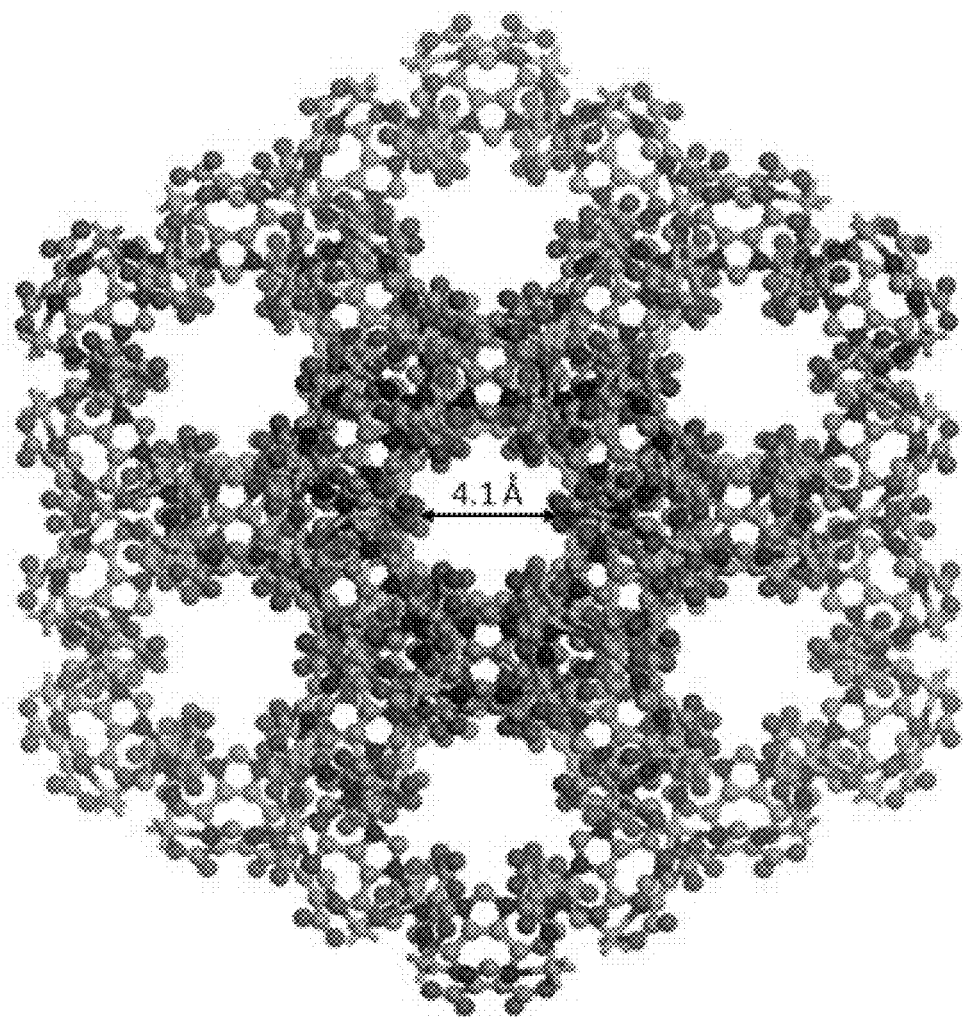
FIG. 1 shows a crystal structure of sod-ZMOF along the six-membered window; Carbon (grey), Indium (green), Nitrogen (blue) and Oxygen (red); hydrogens were removed for clarity.

The development of $CO_2$ selective membrane for the $CO_2$ removal from different commodities such as $H_2$, $CH_4$ and $O_2$ is important to fulfill the growing need in $CO_2$ removal applications in refineries, natural gas production sites as well as in power station. So far, the reported metal organic framework membranes show low permeation selectivity to $CO_2$ particularly in mixture with $H_2$.

A defect-free zeolite-like metal organic framework (ZMOF) thin-film membrane with a pure phase sodalite topology can be fabricated using a solvothermal in-situ crystallization method on an alumina substrate, which can be porous. The absences of cracks/defects can be confirmed by the observation of time-lags during constant-volume/variable pressure permeation tests for gases. Another important feature of this ZMOF membrane is its cation exchange properties that may alter in different ways the gas adsorption and the diffusion properties, thus the possible tuning of permeance and permeselectivity of different industrially relevant gas. Depending on the physical-chemical properties, nature (organic or inorganic) and the position of the extra framework cations, ZMOF membranes can be used to target different separation application including and not limited to $CO_2$ capture, Olefin vs. Paraffin, light Hydrocarbon separation, n-paraffins vs. isoparaffins, cyclic-paraffin vs. aromatic, and so on. The property of the sod-ZMOF may be tuned by the substitution of different organic linkers with different dimensions and functionalities.

For both pure and mixed gas feeds, the ZMOF membrane can exhibit an adsorption-driven selectivity for carbon dioxide over relevant industrial gases, such as $H_2$, $N_2$ and $CH_4$, driven by adsorption. In addition, ZMOF can tackle the problem of reducing the surface modules of the membrane by using a $CO_2$ selective membrane. For example, to purify syngas that contains 30% of $CO_2$ and large fraction (70%) of $H_2$, ZIF-8 membrane that separate $H_2$ (with the large composition) selectively from $CO_2$ has a strict and complex requirement in terms of membrane surface. However, ZMOF membrane can permeate $CO_2$ faster (with the lowest fraction) than $H_2$ (with the highest fraction) with a selectivity of 7, thus leading to smaller module and a drastic simplification of the technology. This high selectivity of the ZMOF membrane can be appropriate for carbon dioxide capture.

A thin film membrane can include a zeolite-like metal-organic framework, and the thin film membrane has a selectivity for $CO_2$ over $H_2$. To prepare a zeolite-like metal-organic framework membrane, a substrate can contact with a carboxylic acid, an imidazole, a metal salt, and a nitric acid to form a zeolite-like metal-organic framework membrane.

ZOMFs are a class of metal-organic frameworks that are topologically isomorphic with zeolites. Zeolites have 3D framework structures built of tetrahedra linked to each other by sharing all the oxygen atoms to form regular intra-crystalline cavities and channels of molecular dimensions. A defining feature of zeolites is that their frameworks are made up of 4-coordinated atoms forming tetrahedra. These tetrahedra are linked together by their corners and make a rich variety of structures. The framework structure may contain linked cages, cavities or channels, which are big enough to allow small molecules to enter. Zeolite-like frameworks is a structure based on tetrahedral nodes.

Porous ZMOFs are a unique subset of MOFs, which are topologically related to inorganic zeolites. These anionic ZMOFs are constructed utilizing the single-metal-ion-based MBB approach that permits the generation of rigid and directional tetrahedral building units (TBUs) based on heterochelation of 6-8-coordinate single-metal ions by angular ditopic organic linkers. The linkers serve to replace the O2 bridges in traditional zeolites, while maintaining the placement of tetrahedra at similar angles (average M-L-M 145°), decorating and expanding the native zeolite-net topology. Zeolite-like metal organic frameworks have been described, for example, in U.S. Pat. No. 8,415,493, which is incorporated by reference in its entirety.

Metal-organic frameworks (MOF) have shown great potential in carbon dioxide separation particularly from $H_2$, $N_2$ and $CH_4$ containing gases using mainly equilibrium and kinetics based adsorption technologies. See, for example, S. Xiang, Y. He, Z. Zhang, H. Wu, W. Zhou, R. Krishna, B. Chen, *Nat. Commun.* 2012, 3, 954; P. Nugent, Y. Belmabkhout, S. D. Burd, A. J. Cairns, R. Luebke, K. Forrest, T. Pham, S. Ma, B. Space, L. Wojtas, *Nature* 2013, each of which is incorporated by reference in its entirety. MOFs, in the form of microcrystalline powder materials, have found their way into many applications, like gas storage, gas separation, catalysis and drug delivery, conferred by their large cavities that can accommodate a large amount of guest molecules and small pore windows that can selectively control the passing of relatively bulky molecules. See, for example, R. J. Kuppler, D. J. Timmons, Q. R. Fang, J. R. Li, T. A. Makal, M. D. Young, D. Q. Yuan, D. Zhao, W. J. Zhuang, H. C. Zhou, *Coord. Chem. Rev.* 2009, 253, 3042-3066; J. R. S. Li, Julian; Zhou, Hong Cai *Chem. Rev.* 2012, 112, 869-932, each of which is incorporated by reference in its entirety.

The demand for integrating MOFs into various kinds of applications like gas sensing, separation and smart membranes is growing and has attracted increasing attention in the last decade. See, for example, O. Shekhah, J. Liu, R. A. Fischer, C. Woell, *Chem. Soc. Rev.* 2011, 40, 1081-1106; J.-R. Li, R. J. Kuppler, H.-C. Zhou, *Chem. Soc. Rev.* 2009, 38, 1477-1504; A. Betard, R. A. Fischer, *Chem. Rev.* 2012, 112, 1055-1083; M. Shah, M. C. McCarthy, S. Sachdeva, A. K. Lee, H.-K. Jeong, *Ind. & Eng. Chem. Res.* 2012, 51, 2179-2199, each of which is incorporated by reference in its entirety. This is mainly due to the unique properties of MOFs over other porous materials, including permanent porosity, tunable pore windows and cage-sizes, in addition to their recently proven chemical and thermal stability. See, for example, M. Eddaoudi, H. L. Li, O. M. Yaghi, *J. Am. Chem. Soc.* 2000, 122, 1391-1397; G. Ferey, *Chem. Soc. Rev.* 2008, 37, 191-214; S. Kitagawa, R. Kitaura, S. Noro, *Angew. Chem. Int. Ed.* 2004, 43, 2334-2375, each of which is incorporated by reference in its entirety. Nowadays, there is a strong need to develop less energy intensive $CO_2$ removal alternatives such as membrane-based approach, which is considered among the emerging and effective techniques for gas separation. The main advantages of this emerging technology versus conventional separation processes are lower energy cost, smaller footprint and modular design. See, for example, M. Freemantle, *Chem. Eng. News* 2005, 83, 3; T.-S. Chung, L. Y. Jiang, Y. Li, S. Kulprathipanja, *Prog. Poly. Sci.* 2007, 32, 483-507; W. Koros, G. Fleming, *J. Memb. Sci.* 1993, 83, 1-80, each of which is incorporated by reference in its entirety.

The use of MOFs as membranes for gas purification and separation is challenging because it depends on the fabrication of continuous MOF thin-films. Despite the intensive work in the fabrication of MOF membranes, it is still in its infancy and a great effort is needed to overcome many obstacles, like growing robust, continuous and defect-free thin films with very good attachment to the support. There have been few reports on MOF grown as thin films or used as a filler in mixed matrix membranes for gas separation.

Membranes fabricated from zeolitic imidazolate frameworks (ZIFs), a subfamily of MOFs, were reported to show good separation performance with gas permeation selectivities exceeding the limit of Knudsen mechanism behaviour. See, for example, Y. S. Li, H. Bux, A. Feldhoff, G. L. Li, W. S. Yang, J. Caro, *Adv. Mater.* 2010, 22, 3322-3324; H. Bux, A. Feldhoff, J. Cravillon, M. Wiebcke, Y.-S. Li, J. Caro, *Chem. Mater.* 2011, 23, 2262-2269, each of which is incorporated by reference in its entirety. ZIF-7, ZIF-8 and ZIF-22 membranes showed $H_2/CO_2$ permeation selectivity, of 13.6, 4.5 and 8.5, respectively particularly at high temperature. See, for example, Y. Li, F. Liang, H. Bux, W. Yang, J. Caro, *J. Membr. Sci.* 2010, 354, 48-54; See, for example, H. Bux, A. Feldhoff, J. Cravillon, M. Wiebcke, Y.-S. Li, J. Caro, *Chem. Mater.* 2011, 23, 2262-2269; A. Huang, H. Bux, F. Steinbach, J. Caro, *Angew. Chem. Int. Ed.* 2010, 49, 4958-4961, each of which is incorporated by reference in its entirety. Molecular sieving performance with $H_2/CO_2$ selectivity of 7.3 was reported using ZIF-90 membrane, which was reported to undergo enhancement up to 62.3 upon post-functionalization of ZIF-90 membrane with free aldehyde groups. See, for example, A. Huang, N. Wang, C. Kong, J. Caro, *Angew. Chem. Int. Ed.* 2012, 51, 10551-10555, which is incorporated by reference in its entirety.

Despite the importance of post, pre-combustion capture and natural gas upgrading applications, a very limited number of studies have been reported so far on the separation of $CO_2/N_2$, $CO_2/CH_4$ and $CO_2/H_2$ gas systems using MOF membranes. A practical membrane for $CO_2$ capture from predominately $H_2$, $N_2$ and $CH_4$ containing gases, should exhibit a high permeance for $CO_2$ as compared to other gases in order to concentrate valuable commodities such as $CH_4$ and $H_2$. The separation permeselectivity in favour of $CO_2$ has been rarely reported with MOF membranes and was only reported on $[Cu_2(bza)_4(puz)]_n$ single-crystal MOF membrane. See, for example, S. Takamizawa, Y. Takasaki, R. Miyake, *J. Am. Chem. Soc.* 2010, 132, 2862-2863, which is incorporated by reference in its entirety.

A zeolite-like metal-organic framework (ZMOF) membrane can be prepared with sodalite topology (sod-ZMOF). ZMOFs represent a subset of MOFs that are topologically related to the pure inorganic zeolites and exhibit similar properties: (i) accessible extra large cavities, (ii) chemical stability, (iii) ion exchange capability that make it possible to control and tune extraframework cations for the enhancement of interaction toward specific guest molecules, and (iv) tunable inorganic and organic components that permit facile alteration of pore size and/or organic functionality. See, for example, Y. L. Liu, V. C. Kravtsov, R. Larsen, M. Eddaoudi, *Chem. Commun.* 2006, 1488-1490, which is incorporated by reference in its entirety. Sod-ZMOF $(In(C_5N_2O_4H_2)_2(C_3N_2H_5))$ possesses a large cavity and small four and six membered windows. The four-membered window has a negligible diameter and the six membered window has a 4.1 Å diameter (FIG. 1).

A thin film membrane can include a zeolite-like metal-organic framework that includes an organic linker and a metal. The metal can include, but not limited to, Indium, Yttrium, or Cadmium. The linker can include, but is not limited to, a heteroaromatic group, such as a nitrogen-containing heteroaromatic group, for example, imidazole or pyrimidine based linkers. In one example, a thin film membrane can include $In(C_5N_2O_4H_2)_2(C_3N_2H_5)$.

The sod-ZMOF membrane can be fabricated by a modified solvothermal reaction conditions than the corresponding synthesis methodology for single crystal growth with the main purpose to promote crystals inter-growth. See, for example, Y. L. Liu, V. C. Kravtsov, R. Larsen, M. Eddaoudi, *Chem. Commun.* 2006, 1488-1490, which is incorporated by reference in its entirety.

A defect-free thin-film ZMOF membrane can be prepared with a sodalite topology using a solvothermal crystallization method. Crystals intergrowth can be achieved by inducing uniform nucleation in the reaction mixture and membrane continuity can be confirmed by the observed time lag behaviour for all the studied gases as well as by probing the competitive permeation of $O_2$ and $N_2$ (largely in favour of $O_2$). The particular anionic character of the sod-ZMOF membrane prone to interaction with the quadruple $CO_2$ and the small pore size (4.1 Å) make it suitable for $CO_2$ capture application. Sod-ZMOF membrane can show $CO_2/H_2$ selectivity of 5.2 and elevate selectivity of 4-6.4 and 10.5 toward $CO_2$ in case of $CO_2/CH_4$ and $CO_2/N_2$ mixtures, respectively. The enhancement of $CO_2/H_2$ selectivity to 12 at low temperature (268 K) and the drop to 2.5 at high temperature (373 K) can indicate the adsorption dominance in permeation selectivity toward $CO_2$ in mixture with $H_2$. This newly reported adsorption driven permeation behaviour in favour of $CO_2$ for polycrystalline MOF membranes, corroborated with analysis of diffusion and sorption behaviours via the solution-diffusion model, can be a breakthrough finding for the rational design of MOF-membrane targeting $CO_2$ capture and separation. Sod-ZMOF can be a suitable platform to target for fabrication of tunable MOF thin-film membranes for diverse separation applications. Sod-ZMOF crystals and membranes can be modified via cation exchange, such as $Li^-$, $Na^+$, $K^+$, $Mg^{2+}$, and so on, having diverse atomic and dimensional properties.

The cation exchanged was examined on the ZMOFs bulk material as $CO_2$ adsorbent, which resulted in improved $CO_2$ adsorption performance compared with as-prepared ZMOFs bulk material. This finding was followed by a molecular simulation study on partially and completely exchanged sod-ZMOFs membrane with Li, Na and K cations that concluded that $CO_2$ adsorption is favored strongly over $CH_4$ adsorption when a binary $CO_2$—$CH_4$ mixture is used. In light of these results, alteration of ZMOFs adsorption and diffusion properties by cation exchange will in turn alter the ZMOF membrane properties. Cation exchange by alkali-metals approach was used to modify sod-ZMOFs membrane.

MOF membrane tuned permeaselectivity properties and $CO_2$ affinity can be tuned via cation exchange. Notable results from the study follow. No effect on membrane continuity was observed, which was confirmed by the high $O_2/N_2$ selectivity and the time lag behavior in the single gas permeation. Enhancement in permeability was observed when membrane exchanged with inorganic cations ($Li^+$, $Na^+$, $K^+$, $Mg^{2+}$, $Ca^{2+}$). It was also observed that $CO_2/H_2$ single gas permeation selectivity remains in favour of $CO_2$ after using 4-methyl imidazolium as organic cation. Moreover, inverted selectivity can be obtained with the inorganic cation ($Li^+$, $Na^+$, $K^+$, $Mg^{2+}$, $Ca^{2+}$) exchanged membrane, even though selectivity in mixture remains in favor of $CO_2$ because of competition between gas mixture components. The $Na^+$ exchanged sod-ZMOF membrane compared with other cations exchanged membranes showed the highest $CO_2/CH_4$ mixture selectivity 49 at 2 bar and 308 K. Even with exchanged cation the sod-ZMOF kept its sorption driven selectivity, and retained high affinity to gas molecules with higher quadruple due to electric field generated by different cations neutralizing the framework. Cation exchanged sod-ZMOF membrane can offer two unique properties by enhancing in parallel both permeability and two key selectivities $CO_2/N_2$ and $CO_2/CH_4$ (Table 1), especially on sod-ZMOF membranes exchanged with $Li^+$ and $Na^+$ cations. The enhancement of $O_2/N_2$ selectivity can indicate improvement in diffusion permeation. Also, intrinsically negative charged ZMOFs may be an excellent platform to study the cation exchange approach on membrane, which can provide a new avenue for the facile tuning of membrane permeaselectivity.

Alumina substrate was polished and activated in ammonium nitrate (0.5M) solution at 85° C. for 2 hours, washed extensively and soaked in de-ionized water and dried completely at 150° C. before use. To prepare the sod-ZMOF, 4,5-Imidazoledicarboxylic acid (65 mg, 0.417 mmol), $In(NO_3)_3 \cdot 2H_2O$ (50 mg, 0.15 mmol), DMF (6.0 mL), $CH_3CN$ (1.5 mL), imidazole (0.6 mL, 1.5 M in DMF), and $HNO_3$ (0.9 mL, 3.5 M in DMF) were added to a 50-mL vial. Mixture was sonicated for ~1 hour, until clear solution obtained, and then the substrate was added to the reaction solution. Sample was heated at 85° C. for 12 hours and at 105° C. for 30 h, the resulting sample taken out from solution, washed with acetonitrile and dried and soaked in acetonitrile for 3 days with solvent refreshing to remove all DMF from the material, and then dried under open air conditions. The prepared membrane was mounted in the permeation cell and sealed with two silicone O-rings from both sides. All permeation tests were performed using constant volume/variable pressure operation mode. After proper activation, the permeability of $N_2$, He, $O_2$, $H_2$ $CH_4$, $C_2H_4$, $C_2H_6$ and $CO_2$ was measured at 308 K at 2 bar upstream pressure.

Powder XRD

XRPD data were recorded on a Panalytical X'Pert Pro diffractometer at 45 kV, 40 mA for $Cu_{K\alpha}$(1.540) Å), with a scan speed of 0.071112 (°/s) and a step size of 0.0167113°

TABLE 1

| | Selectivity | | | | | | | | | |
|---|---|---|---|---|---|---|---|---|---|---|
| | Sod-parent | | Li-Sod | | Na-Sod | | K-Sod | | Mg-Sod | |
| Gas Mixture | Exp | Ideal | Exp | Ideal | Exp | Ideal | Exp | Ideal | Exp | Ideal |
| $CO_2/H_2$: 30/70 | 5.2 | 2.5 | 12.2 | 0.4 | 8.7 | 0.4 | 2.8 | 0.5 | 2.5 | 0.5 |
| $CO_2/N_2$: 10/90 | 10.5 | 9.3 | 6.3 | 13.3 | 13.2 | 12.2 | 10.0 | 5.7 | 9 | 8.2 |
| $CO_2/CH_4$: 50/50 | 6.4 | 4.7 | 10.0 | 10.5 | 49.0 | 28.2 | 19.0 | 6 | 17.0 | 8.6 |

Cation exchanged ZMOF membranes had improved selectivities and permeabilities for separation for $CO_2$ from $H_2$, $CH_4$ and $N_2$ containing gases. Similar separation performance is expects for $CO_2/O_2$ mixtures. Moreover, by using bulky organic and inorganic cations, ZMOF can be tuned to separate linear paraffins from branched paraffins, mono-branched parrafins from di-branched paraffins, linear parrafins from cyclic paraffins and mono and dibranched paraffins from cyclic parrafins.

EXAMPLE

Preparation of ZMOF

Figure 2:
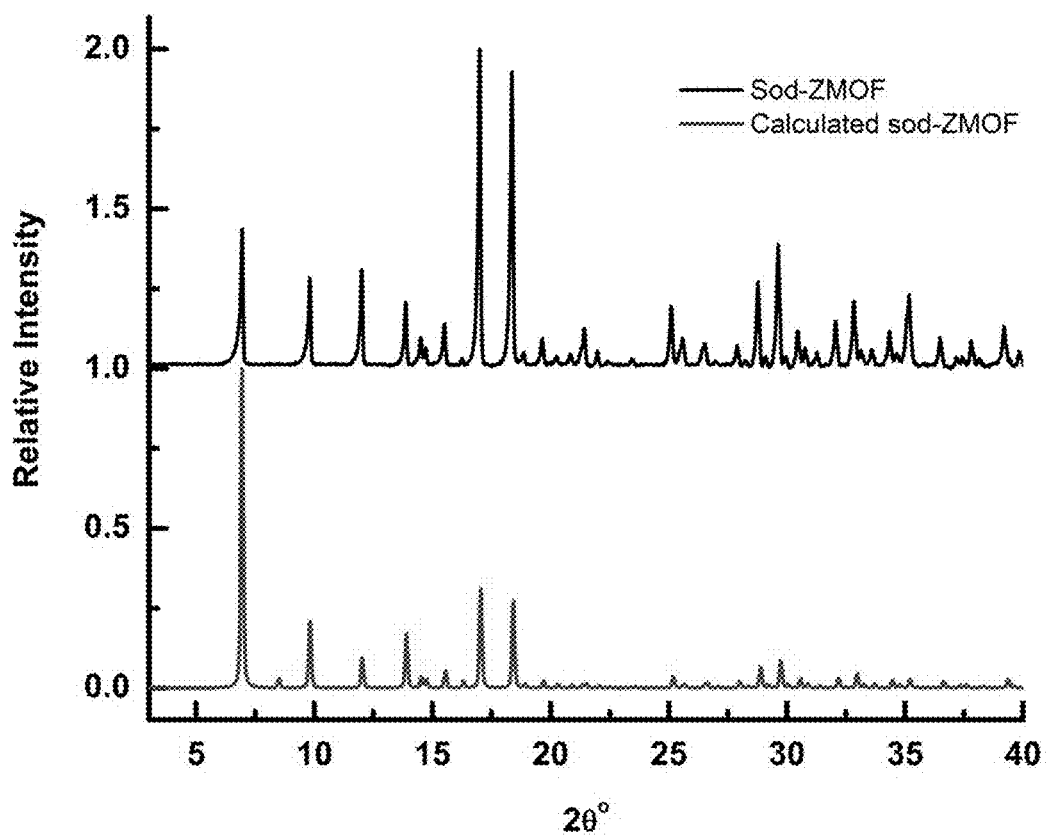
FIG. 2 shows XRD patterns of the sod-ZMOF calculated (red) and sod-ZMOF membrane (black).

To fabricate continuous sod-ZMOF thin film, optimization of reactions conditions was essential. Suitable conditions for the fabrication of closed-continuous sod-ZMOF thin film can be obtained to attach and inter-grow sod-ZMOF crystal on the porous/activated alumina support. This inter-growth was accomplished by a combination of solvothermal reaction scale-up, sonication and heating to induce homogeneous nucleation all over the reaction mixture. Dimethyl formamide (DMF) was exchanged afterward with low boiling point solvent (acetonitrile) and then dried under open air and room temperature conditions to avoid the formation of cracks during the solvent evaporation while drying. The powder X-ray diffraction (PXRD) pattern of the sod-ZMOF membrane (FIG. 2) shows the formation of a pure phase sod-ZMOF with a high degree of crystallinity.

at room temperature. Scanning electron microscope (SEM) images were taken using FEI's desktop Phenom.

Alumina Substrate Fabrication:

Readymade porous alumina substrates (22 mm diameter with 2 mm thickness) were purchased from Cobra Technologies BV.

Low Pressure Adsorption Measurements

Figure 3:
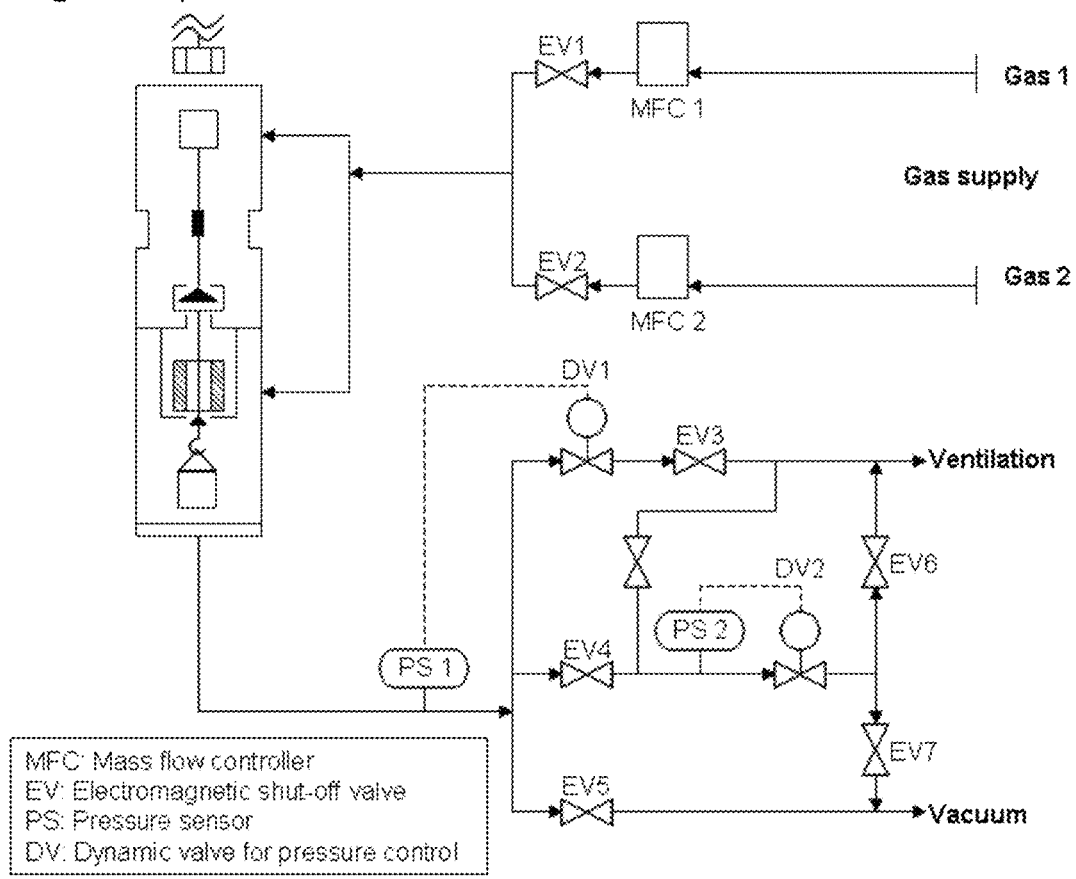
FIG. 3 shows a schematic representation of the Rubotherm gravimetric-densimetric apparatus.

The low pressure adsorption measurement was performed on a fully automated micropore gas analyzer Autosorb-1C (Quantachrome Instruments) at relative pressures up to 1 atm. The determination of the isosteric heats of adsorption ($Q_{st}$) for $CO_2$ was estimated by applying the Clausius-Clapeyron expression using the isotherms measured at 258, 273 and 298 K. In a typical experiment, sod-ZMOF was activated by washing the as-synthesized crystals with DMF followed by solvent exchange in acetonitrile for 7 days. 45-60 mg of activated sample was then transferred to a 6-mm sample cell, evacuated at room temperature for 46 h (using a turbomolecular vacuum pump) and then gradually heated to 160° C./12 h and cooled to room temperature High Pressure Adsorption Measurements Adsorption equilibrium measurements of pure gases were performed using a Rubotherm gravimetric-densimetric apparatus (Bochum, Germany) (FIG. 3), composed mainly of a magnetic suspension balance (MSB) and a network of valves, mass flowmeters and temperature and pressure sensors. The MSB overcomes the disadvantages of other commercially available gravimetric instruments by separating the sensitive microbalance from the sample and the measuring atmosphere and is able to perform adsorption measurements across a wide pressure range, i.e. from 0 to 20 MPa. The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied. The gravimetric method allows the direct measurement of the reduced gas adsorbed amount Ω. Correction for the buoyancy effect is required to determine the excess adsorbed amount using equation 1, where $V_{adsorbent}$ and $V_{ss}$ refer to the volume of the adsorbent and the volume of the suspension system, respectively.

These volumes are determined using the helium isotherm method by assuming that helium penetrates in all open pores of the materials without being adsorbed. The density of the gas is determined using Refprop equation of state (EOS) database and checked experimentally using a volume-calibrated titanium cylinder. By weighing this calibrated volume in the gas atmosphere, the local density of the gas is also determined. Simultaneous measurement of adsorption capacity and gas phase density as a function of pressure and temperature is therefore possible. The excess uptake is the only experimentally accessible quantity and there is no reliable experimental method to determine the absolute uptake. For this reason, only the excess amounts are considered in this work.

$$\Omega = m_{excess} - \rho_{gas}(V_{adsorbent} + V_{ss}) \quad (1)$$

The pressure is measured using two Drucks high pressure transmitters ranging from 0.5 to 34 bar and 1 to 200 bar, respectively, and one low pressure transmitter ranging from 0 to 1 bar. Prior to each adsorption experiment, about 100 mg to 300 mg sample is outgassed 160° C. at a residual pressure $10^{-4}$ mbar. The temperature during adsorption measurements is held constant by using a thermostated circulating fluid.

Pure Gas Permeation Measurements

A constant-volume/variable-pressure apparatus was used to determine the pure gas permeability, diffusion and sorption coefficients of the thin films via the time-lag analysis. A custom cell was used to mount the film and seal it from leaks with O-ring compression on both surfaces. Before each run, the entire system is evacuated under high vacuum at 35° C. until any "leak rate" due to off-gassing is less than 1% of the rate of steady-state pressure rise for any penetrant gas. All pure gas experiments were run at 2-bar feed pressure. The downstream pressure rise during permeation was monitored with a 10 Torr MKS Baratron transduscer and the experiment was stopped after ten time-lags elapsed to ensure steady-state. The permeability of the pure gas is given by $$P = DS = 10^{10}\left(\frac{dp_d^{SS}}{dt} - \frac{dp_d^{LR}}{dt}\right)\frac{V_d l}{(p_{up} - p_d)ART} \quad (2)$$

where P is the permeability coefficient in Barrer ($10^{-10}$ cm$^3$(STP) cm/(cm2 s cmHg)), $dp_d/dt^{ss}$ is the steady-state rate of permeate pressure rise (cmHg/s), $dp_d/dt^{LR}$ is the downstream "leak rate" (cmHg/s), $V_d$ is the downstream volume (cm$^3$), l is the active layer thickness (cm), $p_{up}$ is the upstream pressure (cmHg), A is the membrane area (cm$^2$), R is the gas constant (0.278 cm$^3$ cmHg/(cm$^3$(STP) K)), and T is the temperature at measurement (K). The apparent diffusion coefficient D (cm$^2$/s) is calculated from the time-lag θ (s) as $D = l^2/6\theta$. Assuming permeation occurs via the solution-diffusion mechanism, the solubility coefficient S (cm$^3$(STP)/(cm$^3$ cmHg)), is given by S=P/D.

Mixed Gas Permeation Measurements

Constant-Volume/Variable-Pressure-Gas Chromatography Technique (CV/VP)

The mixed gas permeation properties of the ZMOF thin-film on alumina support were measured at 35° C. using a setup described in literature. See, for example, H. Czichos, T. Saito, L. Smith, *Springer handbook of materials measurement methods*, Vol. 978, Springer, 2006, which is incorporated by reference in its entirety. Feed gas mixtures of $CO_2/CH_4$ in molar ratios of 1:1 were run at 4 bar feed pressure such that the penetrant partial pressures were comparable to those in the pure gas runs. The stage-cut, that is, the ratio of permeate flow rate to feed flow rate, was kept less than 1% such that the residue composition was essentially equal to that of the feed mixture. An Agilent 3000A Micro GC equipped with four columns and thermal conductivity detectors was calibrated for each gas pair over the composition range of interest using several calibration mixtures. A run was stopped once the permeability and permeate composition ceased to vary with time. The mixed gas permeability coefficient of gas i was determined by $$P_i = 10^{10}\left(\frac{dp_d^{SS}}{dt} - \frac{dp_d^{LR}}{dt}\right)\frac{y_i V_d l}{(x_i p_{up} - y_i p_d)ART} \quad (3)$$

where y and x are the mol fractions in the permeate and feed, respectively and the rate of pressure rise is the total rate measured for the permeate gas mixture. When the downstream pressure is negligible relative to the upstream pressure, the separation factor for a gas pair (i/j) is calculated by $$\alpha_j^i = \frac{P_i}{P_j} = \frac{y_i/x_i}{y_j/x_j} \quad (4)$$

Variable Pressure-Continuous Permeate Composition Analysis Technique Using Mass Spectrometry (VP-Continuous Permeate Composition Analysis).

The VP-continuous permeate composition analysis technique is a sample method used to test membrane in almost close conditions to application. The permeate gas composition is monitored continuously until the occurrence of the stead state. In typical experiment for sod-ZMOF membrane, helium is supplied upstream while monitoring the gas composition in the permeate side. The helium flux during this preparation step is maintained to 5-10 cc/min until the establishment of the baseline (only presence of helium). Then, the binary gas mixture with composition $a_{up}$, $b_{up}$ of interest is applied upstream with a maintained flux at 40-50 cc/min while monitoring the composition of the permeate downstream composition $a_{down}$, $b_{down}$. The system is considered in a steady state when no change in the signal of the MS is observed. The permeselectivity is calculated using the following equation (5):

$$\alpha = \frac{a_{up}/b_{up}}{a_{down}/b_{down}}$$

Gas Selectivity of ZMOF

Figure 6:
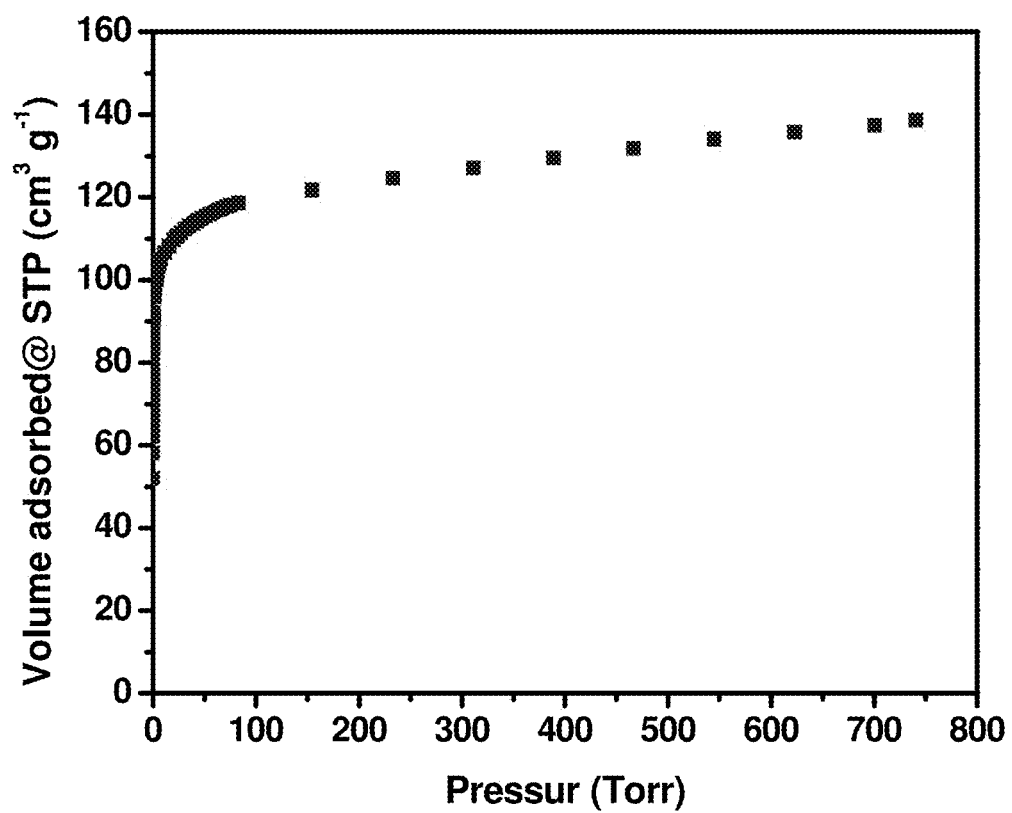
FIG. 6 shows Ar adsorption isotherm of sod-ZMOF crystals at 87 K.

Argon adsorption studies performed on the acetonitrile-exchanged sample of sod-ZMOF show reversible Type-I isotherms representative of a microporous material (FIG. 6). The apparent BET and Langmuir specific surface area and pore volume for sod-ZMOF crystals was determined to be 474 m$^2$ g$^{-1}$, 590 m$^2$ g$^{-1}$ and 0.18 cm$^3$ g$^{-1}$, respectively. The narrow size of sod-ZMOF pore windows is anticipated to provide selective diffusion driving forces allowing a relatively easy passing of small molecules versus larger ones. In addition to that, its anionic character may alter the adsorption/diffusion, and also in turn permeation, properties of specific gases for gas separation applications.

Figure 4:
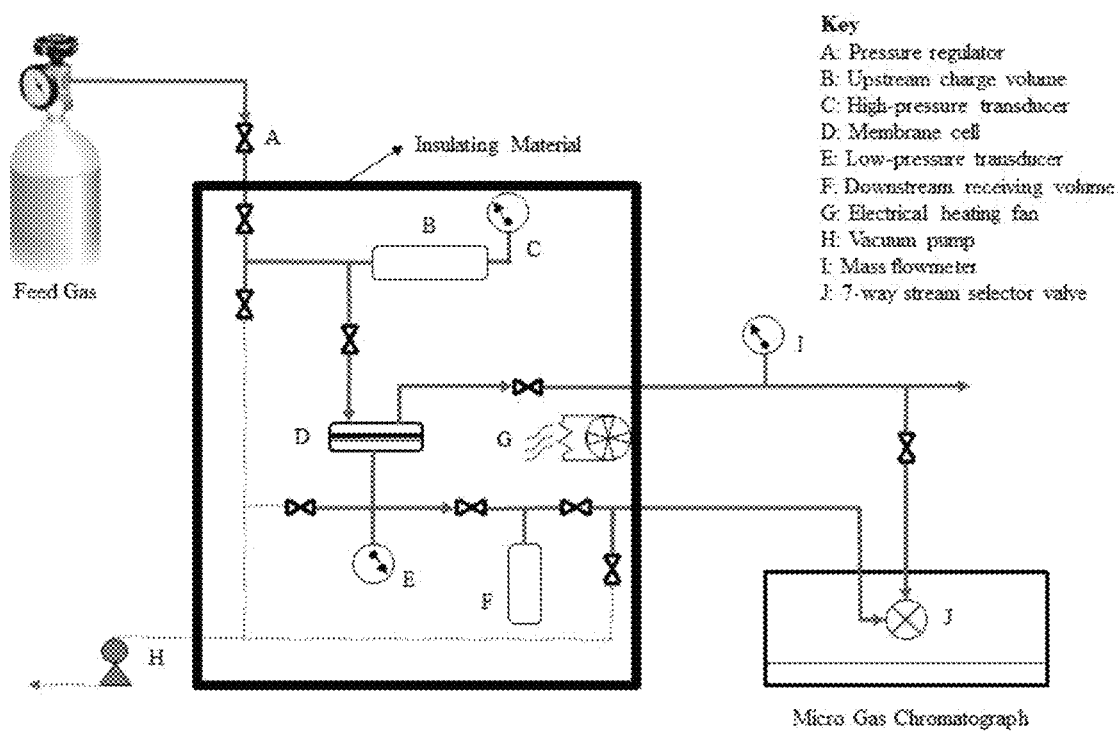
FIG. 4 shows a schematic representation of the Constant-volume/variable-pressure-Gas chromatography set-up
Figure 7:
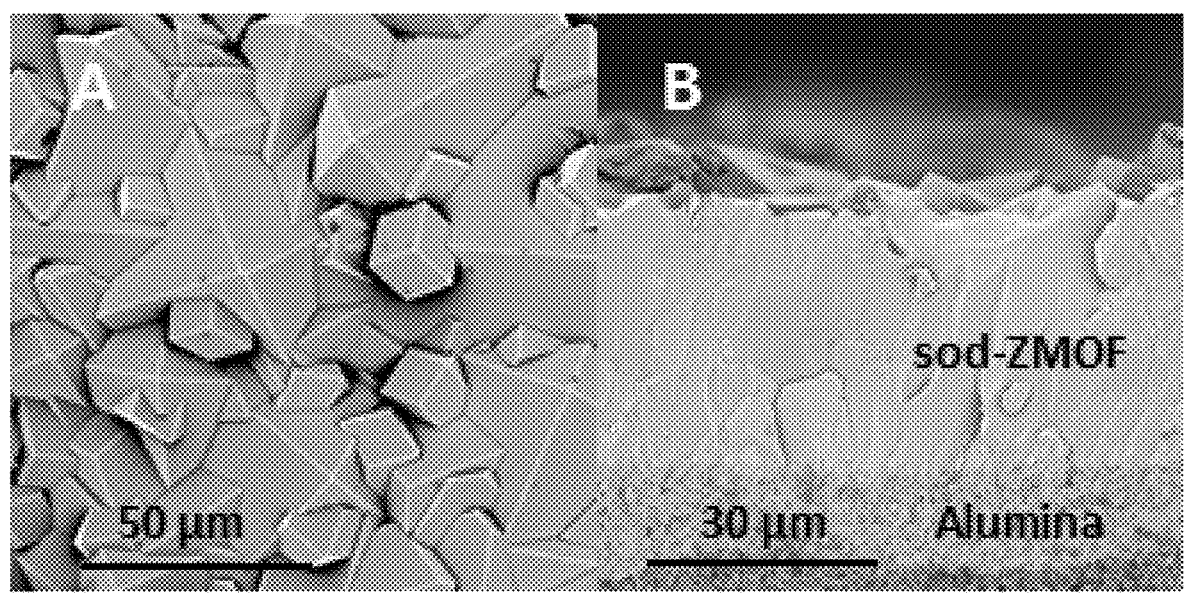
FIG. 7 shows SEM images of sod-ZMOF membrane supported on alumina substrate, top view (A) and cross section (B).
Figure 8:
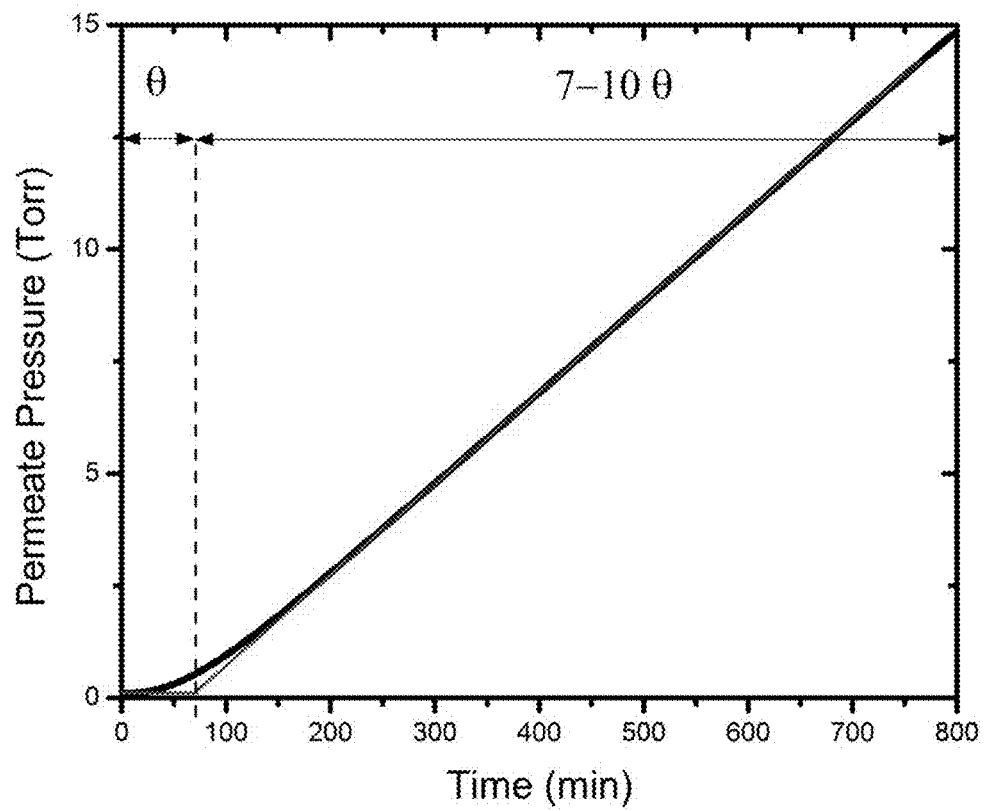
FIG. 8 shows an Example of the typical time lag experiment.
Figure 9A:
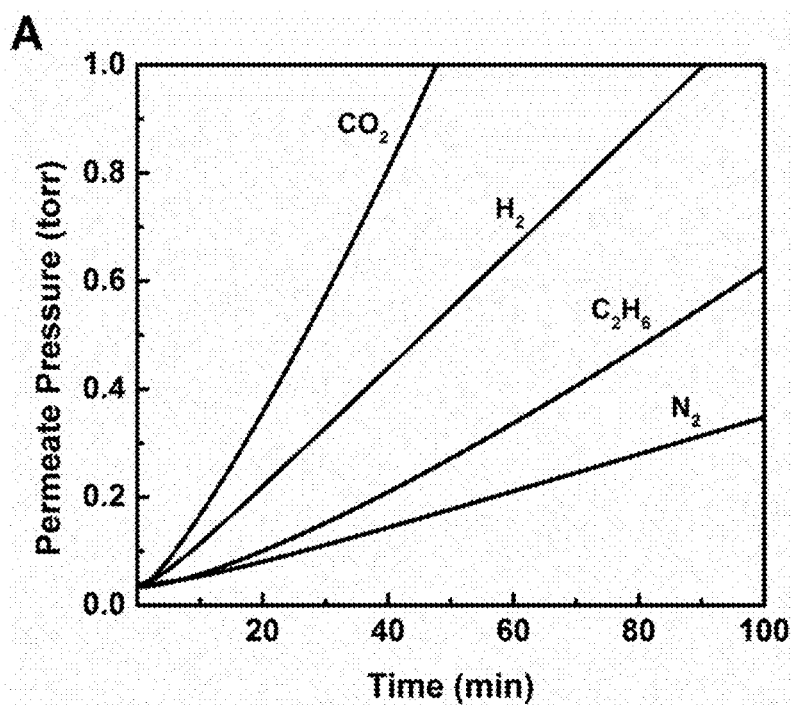
FIG. 9A shows a representative single gas permeation graph at 308 K showing time lag behaviour of $CO_2$, $N_2$, $H_2$ and $C_2H_6$ gases.
Figure 9B:
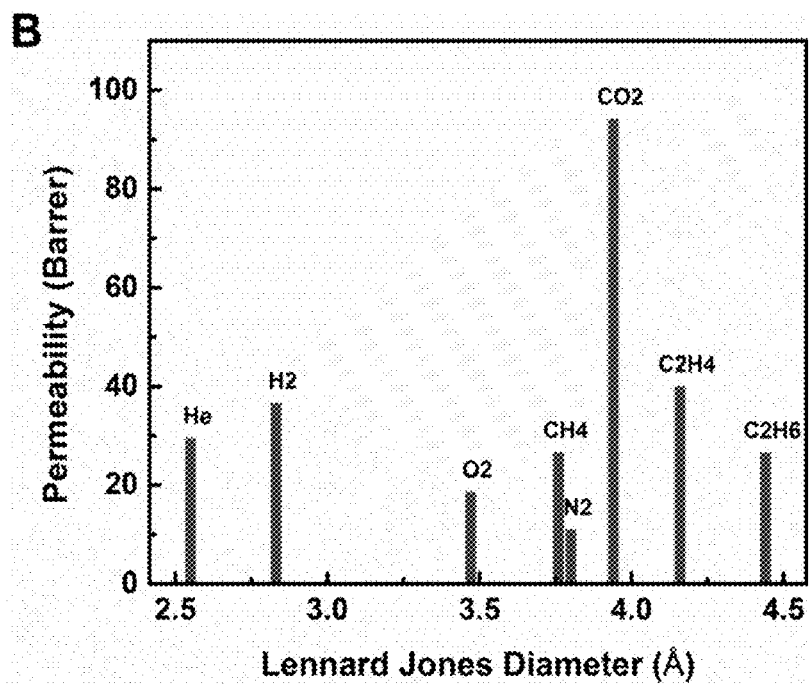
FIG. 9B shows single gas permeability vs. Lennard Jones diameter of He, $H_2$, $CO_2$, $O_2$, $N_2$, $CH_4$, $C_2H_4$ and $C_2H_6$ at 308 K on sod-ZMOF membranes.

The resulting sod-ZMOF thin-film membrane with a separating layer thickness of 35-40 μm (as determined by SEM images, FIG. 7) was mounted in a custom made permeation cell and sealed from both sides with silicon O-rings for leak-tight gas permeation testing. The single gas permeation of He, H$_2$, CO$_2$, N$_2$, O$_2$, CH$_4$, C$_2$H$_4$ and C$_2$H$_6$ (>99.99%) was performed on the sod-ZMOF membrane using the constant-volume/variable-pressure (CV/VP) permeation technique (FIG. 4). See, for example, H. Czichos, T. Saito, L. Smith, *Springer handbook of materials measurement methods*, Vol. 978, Springer, 2006, which is incorporated by reference in its entirety. To remove any residual guest molecules (mainly acetonitrile) additional activation was carried out in-situ by evacuation at 308 K. The membrane was considered to be fully evacuated when the downstream pressure-rise was less than 1% during the tightness test. Pure single gas permeation tests were performed by applying an upstream pressure of 2 bar. Successively, the downstream pressure rise was monitored for each single gas permeation run (He, H$_2$, CO$_2$, N$_2$, O$_2$ CH$_4$, C$_2$H$_4$ and C$_2$H$_6$) using a 10 Torr transducer. The gas permeation was assumed to be at steady state when no variation was observed in the pressure rise, i.e. 7-10 times after the time-lag has elapsed (FIG. 8). Time-lag behaviour was observed for all the tested gases (FIG. 9A) indicating that the film is defect-free. The elevated O$_2$/N$_2$ selectivity of 1.7 is a further confirmation of the film's continuity. Single permeation experiments show a sharp maximum in CO$_2$ permeability compared to all the other tested gases (Table 1). Therefore, as shown in FIG. 9B, the sod-ZMOF membrane exhibits higher ideal selectivity for CO$_2$ over other gases. The obtained separation factors for CO$_2$ over N$_2$, O$_2$ and CH$_4$ were 8.7 (CO$_2$/N$_2$), 5.1 (C/O$_2$) and 3.6 (CO$_2$/CH$_4$) (see Table 2), respectively. This selectivity toward CO$_2$ particularly versus H$_2$ is the highest reported so far using MOF-based membranes (see Table 3).

TABLE 1

Pure-gas permeation properties.

| Gas | Lennard Jones Diameter [Å] | Normal Boiling Point [K] | Permeability [Barrer]* | Permeance [mol/(s m$^2$ Pa)] | Diffusivity Coeff. [cm$^2$/s] | Solubility Coeff. [cm$^3$(gas)/(cm$^3$(MOF) cmHg)] |
|---|---|---|---|---|---|---|
| He | 2.55 | 4.2 | 29.4 | 2.0E−10 | — | — |
| H$_2$ | 2.83 | 20 | 36.5 | 2.4E−10 | 1.8E−07 | 2.0E−02 |
| N$_2$ | 3.8 | 77 | 10.8 | 7.3E−10 | 1.5E−08 | 7.0E−02 |
| O$_2$ | 3.47 | 90 | 18.5 | 1.2E−10 | 2.6E−08 | 7.3E−02 |
| CH$_4$ | 3.76 | 111 | 26.5 | 1.8E−10 | 1.5E−08 | 1.7E−01 |
| CO$_2$ | 3.94 | 217 | 94.1 | 6.3E−10 | 2.6E−08 | 3.6E−01 |
| C$_2$H$_4$ | 4.16 | 170 | 39.8 | 2.7E−10 | 1.3E−08 | 3.0E−01 |
| C$_2$H$_6$ | 4.44 | 185 | 26.4 | 1.8E−10 | 8.7E−09 | 3.1E−01 |

*Barrer [=] 10$^{-10}$cm$^3$(STP) cm/(cm$^2$ s cmHg). Solubility coefficients were independently measured with Rubotherm apparatus from equilibrium adsorption. Permeability coefficients were independently measured from permeation experiments. Diffusion coefficients were back-calculated as D = P/S from solution-diffusion theory.

TABLE 2

Ideal selectivity on sod-ZMOF membrane.

| Gas mixture | Ideal selectivity |
|---|---|
| CO$_2$/He | 3.2 |
| CO$_2$/H$_2$ | 2.6 |
| CO$_2$/N$_2$ | 8.7 |
| CO$_2$/O$_2$ | 5.1 |
| CO$_2$/CH$_4$ | 3.6 |
| H$_2$/N$_2$ | 3.4 |
| H$_2$/O$_2$ | 2.0 |
| H$_2$/CH$_4$ | 1.4 |
| O$_2$/N$_2$ | 1.7 |

TABLE 3

Different MOF membranes and reported selectivities.

| MOF thin film | topology | Pore size/window size | Gas system | Selectivity | Condition | Ref. |
|---|---|---|---|---|---|---|
| ZIF-7 | Sod | | H$_2$/CO$_2$ | 13.6 | 220° C., 1 bar | [1] |
| ZIF-22 | LTA | 3/ | H$_2$/CO$_2$ | 7.2 | 50° C., 0.5 bar | [2] |
| ZIF-90 | Sod | 3.5 | H$_2$/CO$_2$ | 7.3 | 200° C., 1 bar | [3] |

TABLE 3-continued

Different MOF membranes and reported selectivities.

| MOF thin film | topology | Pore size/ window size | Gas system | Selectivity | Condition | Ref. |
|---|---|---|---|---|---|---|
| ZIF-90 post functionalized | Sod | <3.5 | $H_2/CO_2$ | 62.3 | | [4] |
| ZIF-8 | Sod | 3.4 | $CO_2/CH_4$ | 4 to 7 | 295 K and 139.5 KPa | [5] |
| SIM-1 | Sod | 8 | $CO_2/N_2$ | 1.1 | | [6] |

See, for example,
[1] Y. Li, F. Liang, H. Bux, W. Yang, J. Caro, *J. Memb. Sci.* 2010, 354, 48-54;
[2] A. Huang, H. Bux, F. Steinbach, J. Caro, *Angew. Chem. Int. Ed.* 2010, 49, 4958-4961;
[3] A. Huang, W. Dou, J. Caro, *J. Am. Chem. Soc.* 2010, 132, 15562-15564;
[4] A. Huang, J. Caro, *Angew. Chem. Int. Ed.* 2011, 50, 4979-4982;
[5] S. R. Venna, M. A. Carreon, *J. Am. Chem. Soc.* 2009, 132, 76-78;
[6] S. Aguado, C.-H. Nicolas, V. Moizan-Baslé, C. Nieto, H. Amrouche, N. Bats, N. Audebrand, D. Farrusseng, *N. J. Chem.* 2011, 35, 41-44, each of which is incorporated by reference in its entirety.

Figure 5:
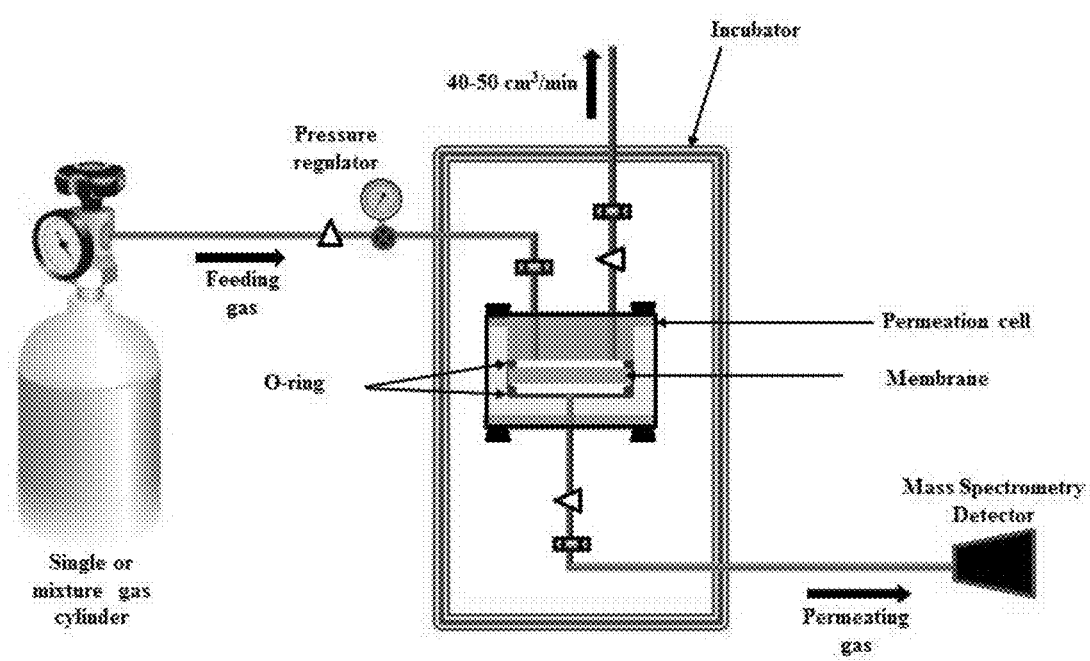
FIG. 5 shows a schematic representation of the variable-pressure-continuous permeates composition analysis technique.
Figure 10:
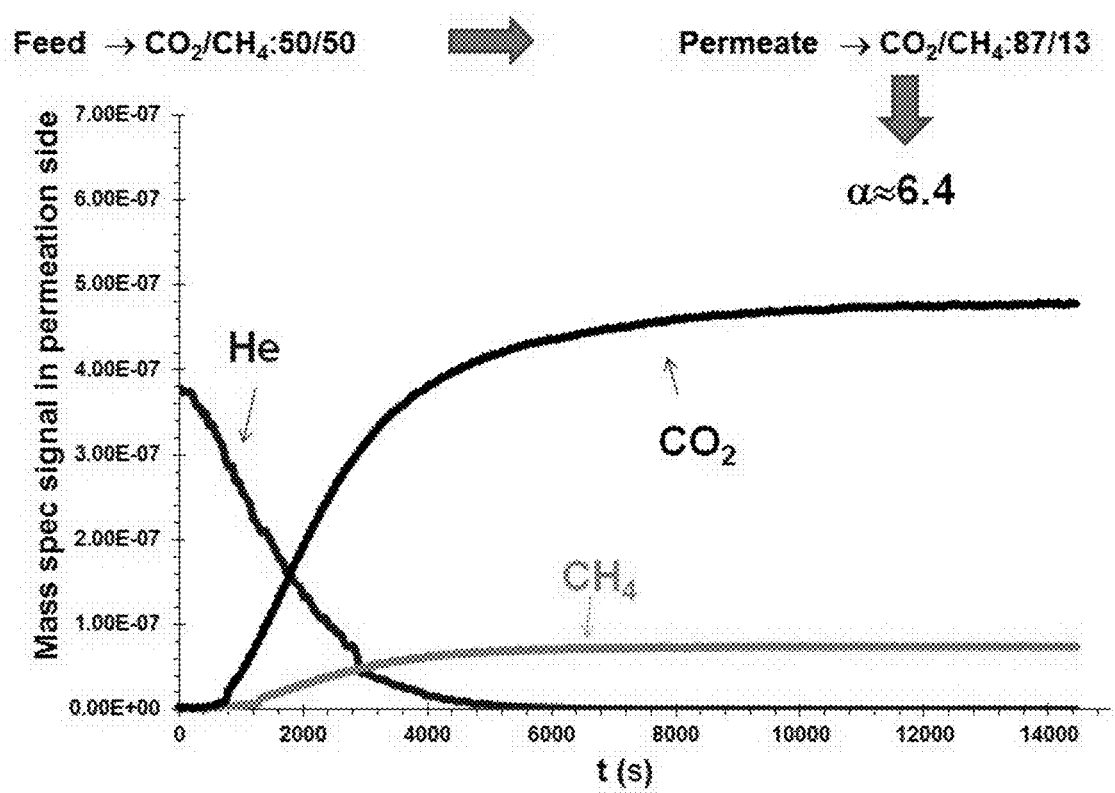
FIG. 10 shows $CO_2/CH_4$: 50/50 mixture permeation tested using VP-continuous permeate composition analysis technique at 308 K with 3.4 bar as a feed pressure.
Figure 11:
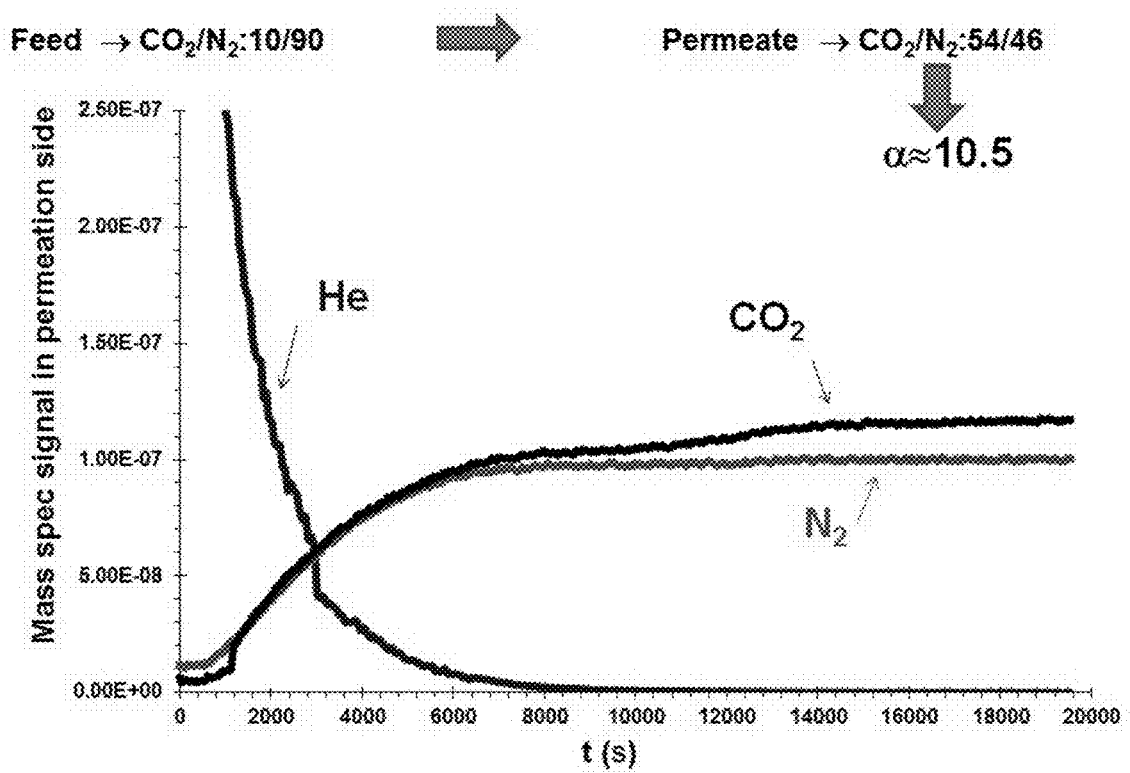
FIG. 11 shows $CO_2/N_2$: 10/90 mixture permeation tested using VP-continuous permeate composition analysis technique at 308 with 3.4 bar as a feed pressure.
Figure 15A:
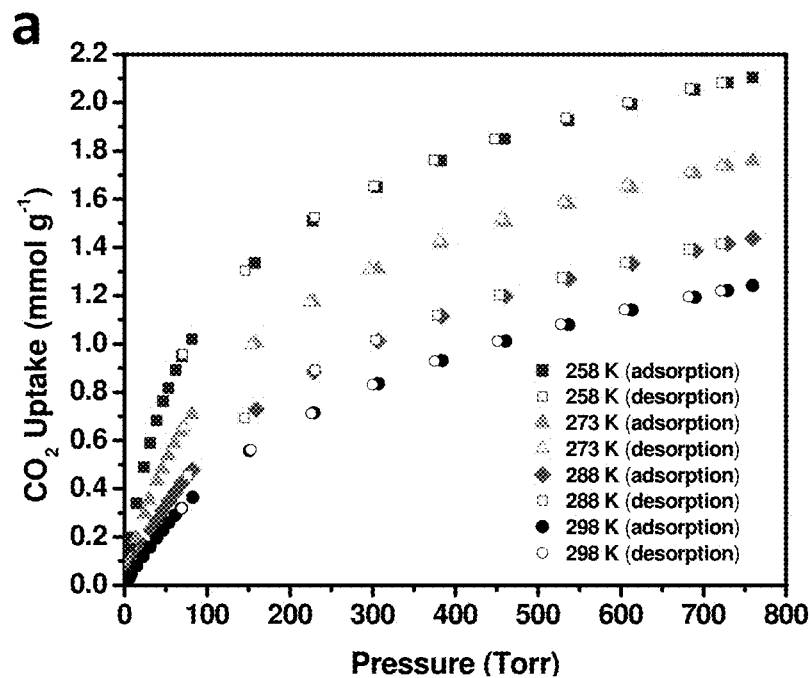
FIGS. 15A-15B show $CO_2$ sorption data for sod-ZMOF: (a) fully reversible variable-temperature $CO_2$ isotherms and (b) $Q_{st}$ for $CO_2$ calculated from the corresponding isotherms.
Figure 15B:
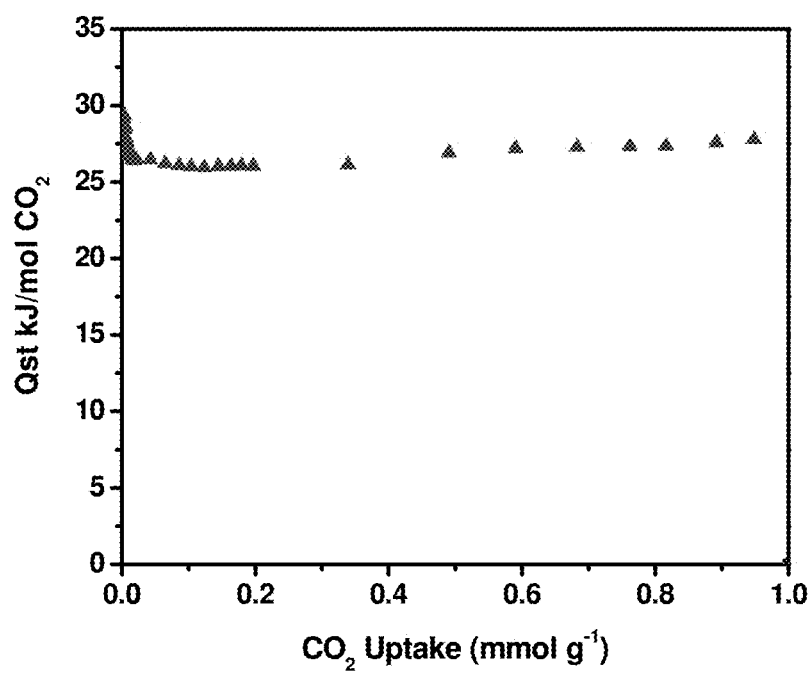
Figure 16A:
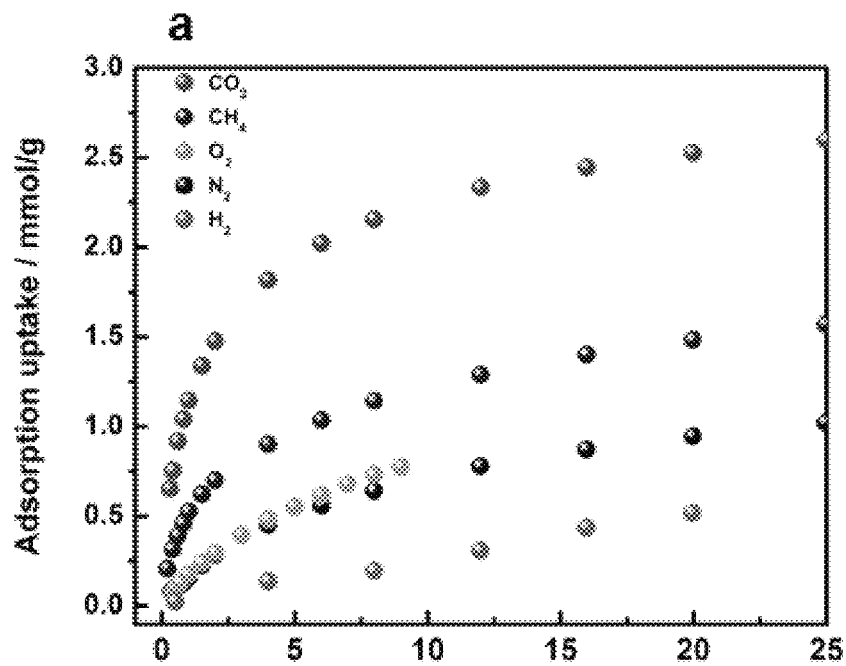
FIG. 16A shows adsorption of $CO_2$, $N_2$, $O_2$, $CH_4$ and $H_2$ at 298 K on sod-ZMOF

In order to further confirm this selective permeation in favour of $CO_2$, $CO_2/CH_4$:50/50 and $CO_2/N_2$:10/90, gas-mixture permeation experiments were carried out using two permeation systems, namely state-of-the-art CV/VP-gas chromatography technique (FIG. 4) and mixture gas permeation combined with continuous gas analysis setup (FIG. 5). Both experiments revealed a selectivity toward $CO_2$ of 4-6.4 and 10.5 (at 3.4 bar) for the two gases systems, respectively, in good agreement with the ideal selectivity of 3.6 for $CO_2/CH_4$ and 8.7 for $CO_2/N_2$, obtained from pure-gas permeation testing at 2 bar (Table 4, FIG. 10 and FIG. 11). For the $CO_2$—$H_2$ pair gas system the $CO_2$ permeability was faster than $H_2$ with a $CO_2/H_2$ ideal selectivity of 2.6.

were investigated at low sub-atmospheric pressure and different temperatures (FIG. 15A), in order to determine the evolution of heat of adsorption (isosteric heat $Q_{st}$). The $CO_2$ $Q_{st}$ at low loading was found to be 29 kJ/mol (FIG. 15B) resulting mainly from the combination of interaction with the quadruple moment of $CO_2$ with the charged framework and the effect of pore size. The adsorption data of $N_2$, $O_2$, $CH_4$ and $H_2$ (FIG. 16A) showed a much lower adsorption uptake at room temperature as compared to $CO_2$. Under these conditions, it is thus expected that a high adsorption selectivity toward $CO_2$ will be obtained particularly vs. $H_2$. Accordingly, prediction of $CO_2/N_2$, $CO_2/O_2$, $CO_2/CH_4$ and $CO_2/H_2$ adsorption selectivities in gas mixtures akin to

TABLE 4

$CO_2/CH_4$ mixed gas permeation results using CV/VP - gas chromatography

| Binary Mixture (50:50) | Permeability $CO_2$ [Barrer] | Permeance $CO_2$ [mol/(m² · s · Pa)] | Permeability $CH_4$ [Barrer] | Permeance $CH_4$ [mol/(m² · s · Pa)] | Separation Factor |
|---|---|---|---|---|---|
| $CO_2/CH_4$ (4 bar) | 72.8 | 4.87 × 10⁻¹⁰ | 18.4 | 1.23 × 10⁻¹⁰ | 4.0 |

Figure 12:
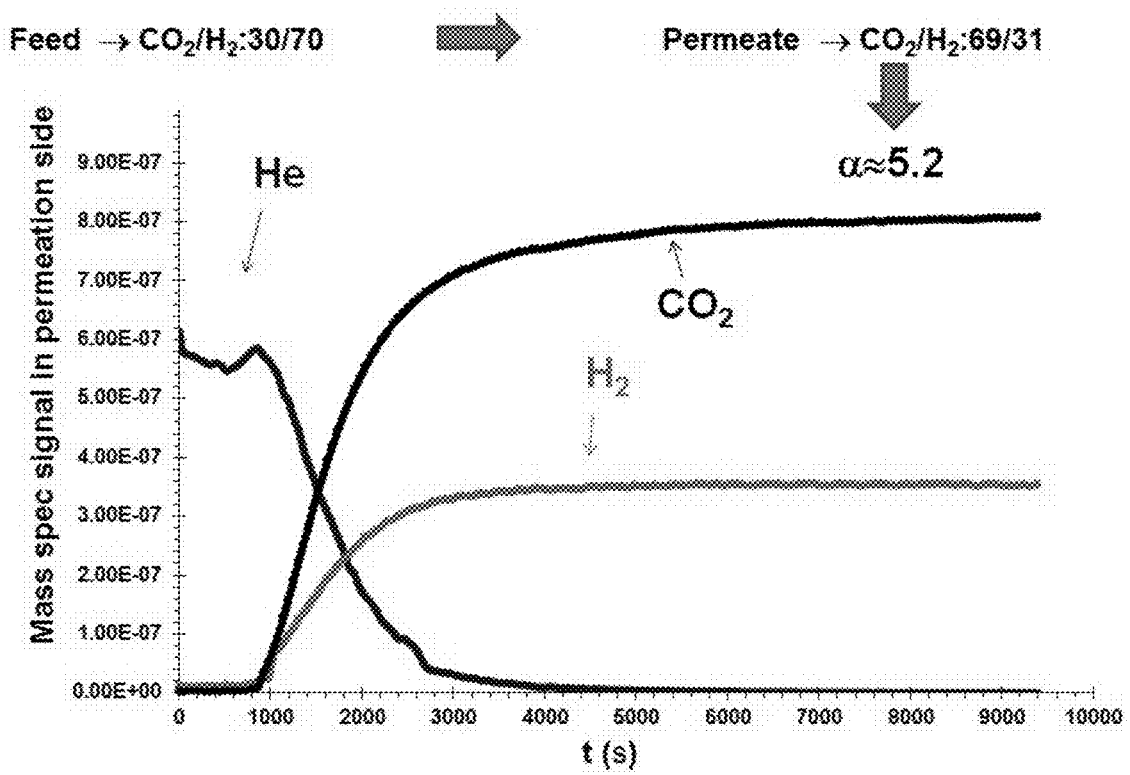
FIG. 12 shows $CO_2/H_2$: 30/70 mixture permeation tested using VP-continuous permeate composition analysis technique at 308 with 3.4 bar as a feed pressure.
Figure 13:
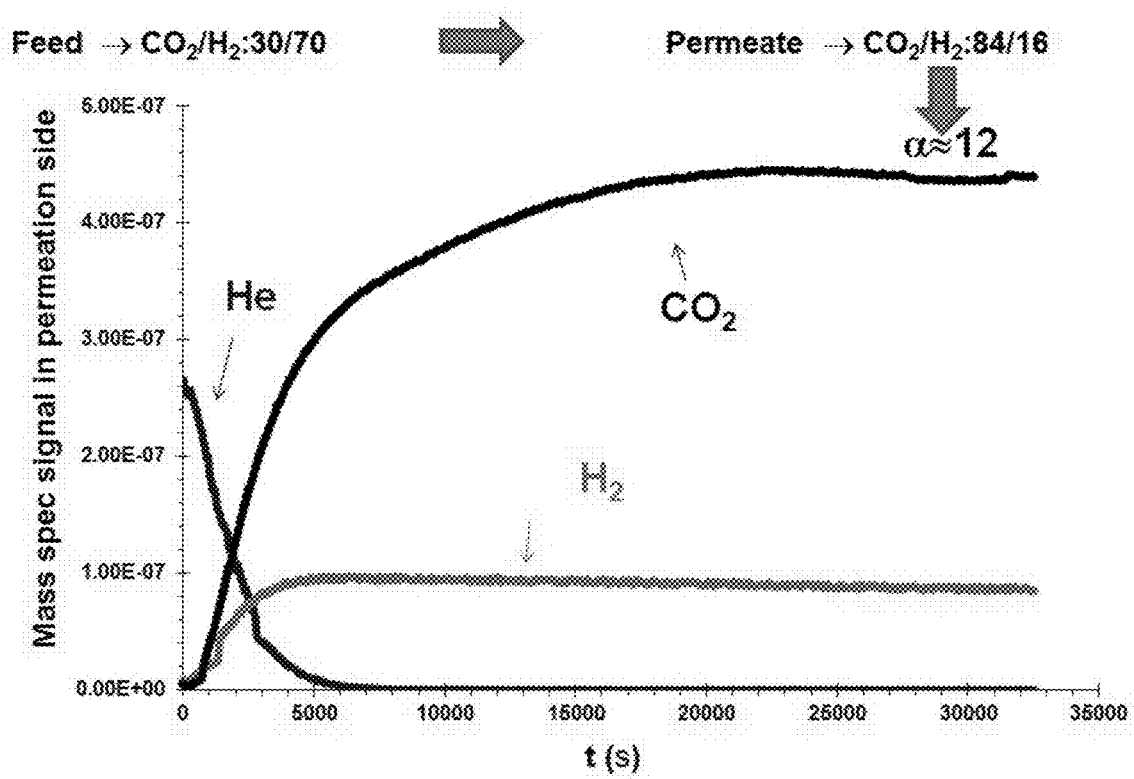
FIG. 13 shows $CO_2/H_2$: 30/70 mixture permeation tested using VP-continuous permeate composition analysis technique at 268 K with 3.4 bar as a feed pressure.
Figure 14:
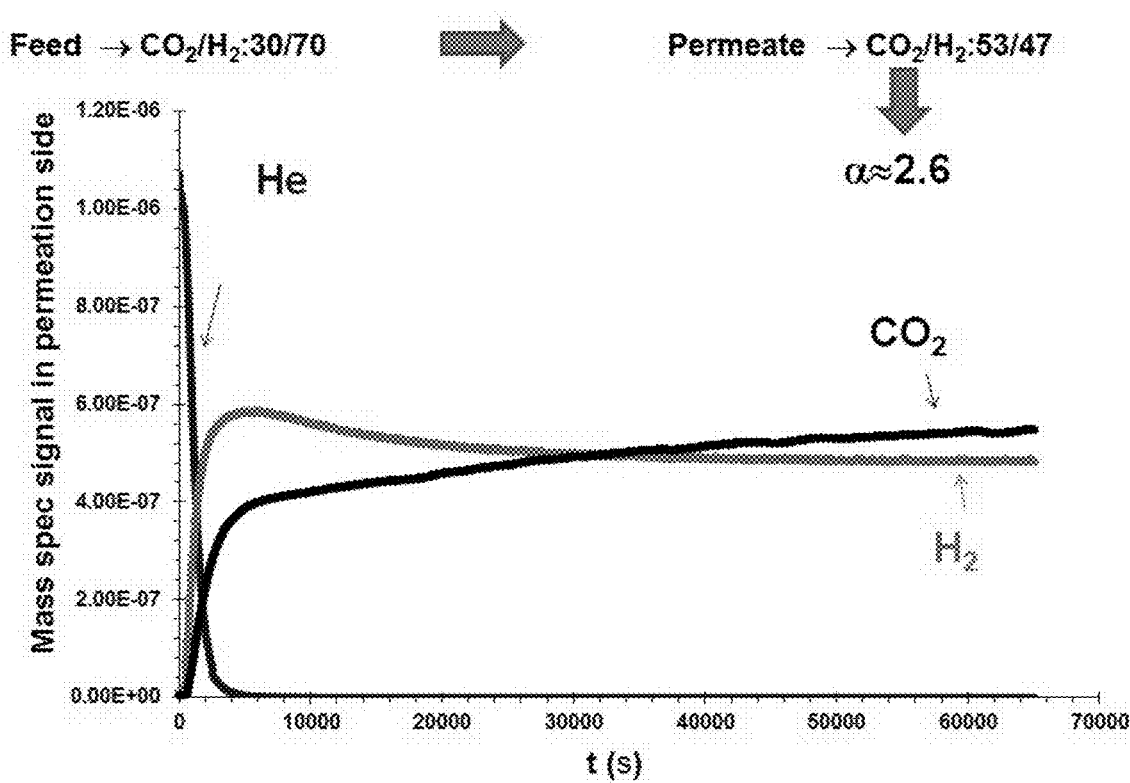
FIG. 14 shows $CO_2/H_2$: 30/70 mixture permeation tested using VP-continuous permeate composition analysis technique at 353 K with 3.4 bar as a feed pressure.

The observed reverse-selectivity, for polycrystalline MOF-based membranes, was confirmed by performing $CO_2$/ $H_2$:30/70 mixture gas permeation (FIG. 12) using permeation-continuous gas analysis set-up (FIG. 5). The obtained $CO_2/H_2$ selectivity of 5.2 in favour of $CO_2$ at 308 K and 3.4 bar is likely attributed to the governance of $CO_2$ adsorption over $H_2$ in $CO_2/H_2$ mixture permeation. To confirm this adsorption driven behaviour, permeation test were performed at 268 and 353 K. The enhancement and contraction of $CO_2/H_2$ selectivity to 12 at low temperature (268 K) (FIG. 13) and 2.5 at higher temperature (353 K) (FIG. 14), respectively was another confirmation that $CO_2/H_2$ gas permeation is mainly governed by adsorption. In contrast to ZIFs, which are neutral, the anionic framework of the sod-ZMOFs, is mainly responsible for the reversed $CO_2/H_2$ selectivity. See, for example, J. F. Eubank, H. Mouttaki, A. J. Cairns, Y. Belmabkhout, L. Wojtas, R. Luebke, M. H. Alkordi, M. Eddaoudi, *J. Am. Chem. Soc.* 2011, 133, 14204-14207, which is incorporated by reference in its entirety. These findings are important as the economically feasible processing of shifted syngas ($H_2/CO_2$ mixture) require a selective membrane for the less dominant fraction which is $CO_2$.

Figure 16B:
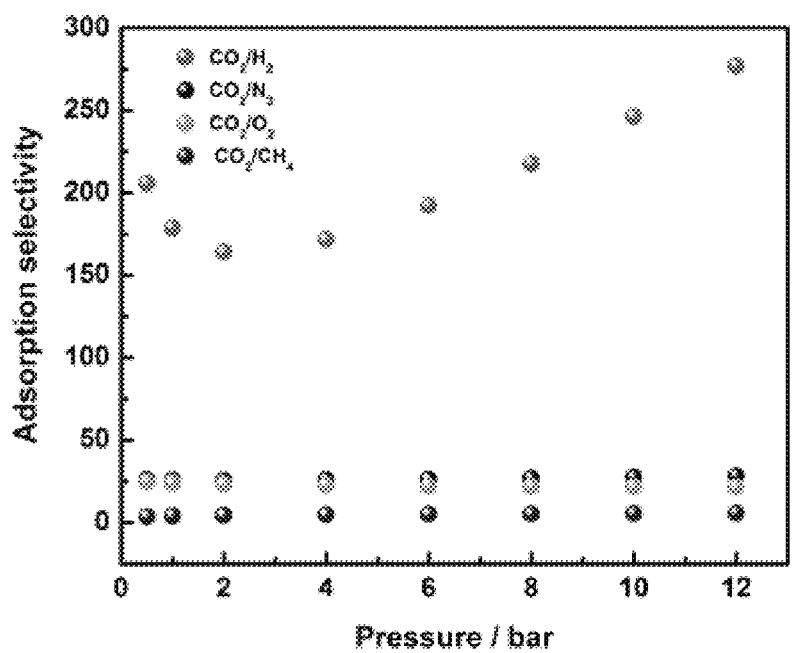
FIG. 16B shows IAST prediction of $CO_2/N_2$:10/90, $CO_2/O_2$:5/95, $CO_2/CH_4$:5/95, $CO_2/H_2$:30/70 mixtures adsorption selectivity (bottom).

In order to further confirm the selective adsorption of $CO_2$, the $CO_2$ adsorption properties of sod-ZMOF crystals industrial gases using Ideal Adsorption Solution Theory (IAST) (see FIG. 16B) shows that the sod-ZMOF exhibits high $CO_2$ selectivity versus $H_2$ in comparison to $CH_4$, $N_2$ and $O_2$. See, for example, H. Chen, D. S. Sholl, *Langmuir* 2007, 23, 6431-6437; A. L. Myers, J. M. Prausnitz, *AIChE* 1965, 11, 121-127, which is incorporated by reference in its entirety. The sequence of the adsorption selectivity was $CO_2/H_2$>>>$CO_2/N_2$≈$CO_2/O_2$>$CO_2/CH_4$.

The single gas permeation data along with sorption data were further analyzed using the solution-diffusion model, applicable to structures with nominal pore diameter less than 10 Å. See, for example, R. Baker, *Membrane technology and applications*, Wiley, 2012, which is incorporated by reference in its entirety. In this model, gas permeability through a dense or microporous framework is the product of diffusion and solubility effects. Diffusion is characterized by a diffusion coefficient, D, which is a measure of the kinetics of gas transport through the membrane (thin film) and can be correlated well with a measure of the gas molecular size. D may be calculated from experimental permeation time-lags or back-calculated from adsorption and permeation data. Solubility is characterized by a sorption coefficient, S, which comprises the framework interactions with the gases and can be correlated well with their condensability. S may be obtained indirectly from the solution-diffusion model via knowledge of P and D, or directly from equilibrium adsorption isotherms if the material density is known.

Figure 17A:
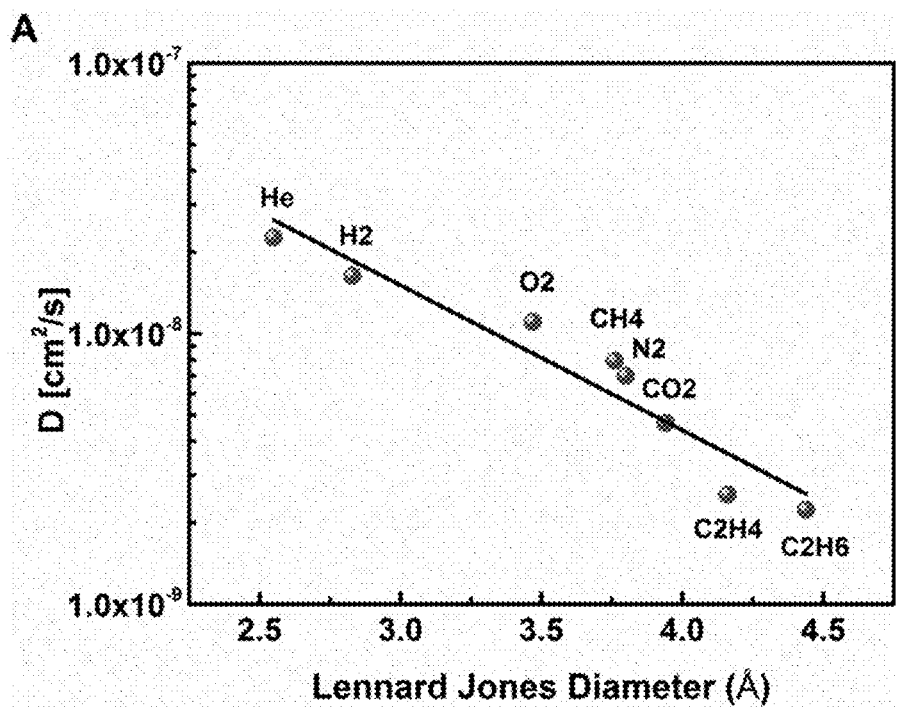
FIG. 17A shows diffusion coefficients (D) vs. Lennard Jones diameter.
Figure 17B:
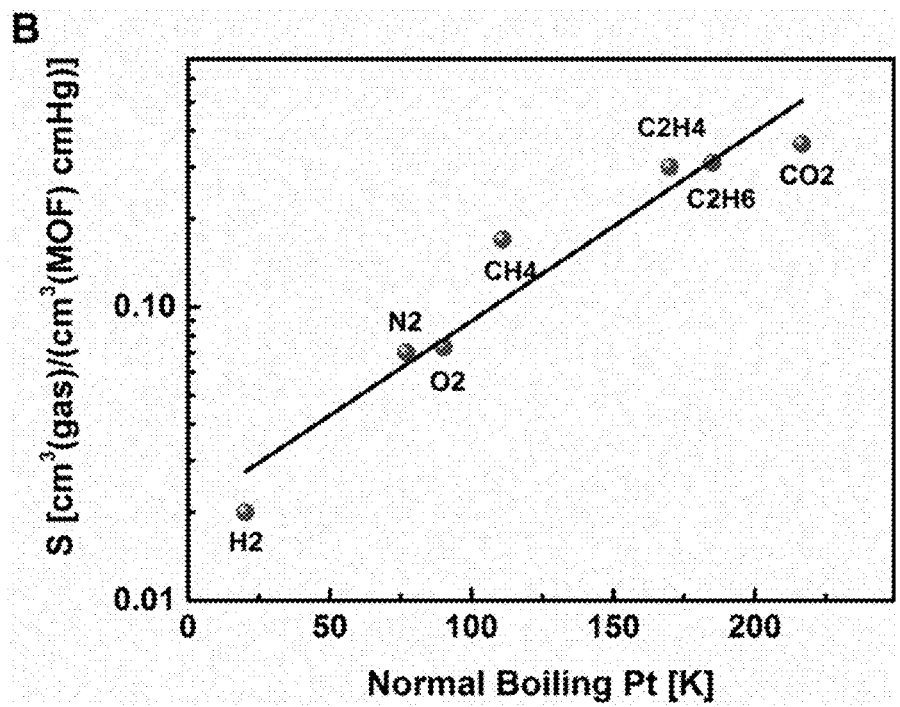
FIG. 17B shows solubility coefficients (S) (from sorption data) vs. normal boiling point as determined from CV/VP technique at 2 bar.

Here, since independent measurements of both P and S using gas permeation and adsorption isotherms, respectively, were available, D was more accurately calculated as D=P/S. See, for example, Y. P. Yampolskii, I. Pinnau, B. D. Freeman, *Materials science of membranes for gas and vapor separation*, Wiley Online Library, 2006, which is incorporated by reference in its entirety. FIG. 17A demonstrates that larger gas molecules experience more resistance to diffusion through the sod-ZMOF framework, causing a general decline in diffusion coefficients with size (here used as Lennard Jones diameters). See, for example, J. R. Li, R. J. Kuppler, H. C. Zhou, *Chem. Soc. Rev.* 2009, 38, 1477-1504, which is incorporated by reference in its entirety. As the probe molecules approach the 4.1 Å pore aperture size estimated from crystal structure data, diffusion becomes more restricted. A 20-fold drop in D coefficients occurs from $H_2$ (2.8 Å) through $CO_2$ to $C_2H_6$ (>4 Å). With regards to adsorption at equilibrium, condensable gases exhibit generally stronger interactions with the medium of transport as an increase in the solubility coefficient, S, is observed with increasing boiling point in FIG. 17B. However, in the solution-diffusion model the rate-limiting step in gas permeation is typically the Fickian diffusion across the film thickness. That is, one might expect permeability coefficients to trend downwards with penetrant size like diffusion coefficients, as is often shown in the ZIF-8. See, for example, H. Bux, F. Liang, Y. Li, J. Cravillon, M. Wiebcke, J. Caro, *J. Am. Chem. Soc.* 2009, 131, 16000-16001, which is incorporated by reference in its entirety. Instead, the sod-ZMOF demonstrates adsorption-driven permeation that somewhat trends with the condensability of the gas, like the sorption coefficients that result in increase of permeability for the more condensable gases except for $C_2H_6$ which may be experiencing strong diffusional resistance as it is closest in size to the aperture size. The key observation, however, is that despite the restriction on the diffusion of $CO_2$ by the rigid and relatively small pore apertures, the affinity of sod-ZMOF to $CO_2$ grants it the maximum, adsorption-driven, permeability of all tested gases.

Other embodiments are within the scope of the following claims.

What is claimed is:

1. A thin-film membrane comprising a continuous zeolite-like metal-organic framework (ZMOF) thin film intergrown on a substrate; wherein the continuous ZMOF thin film has a sodalite topology.

2. The membrane of claim 1, wherein the continuous ZMOF thin film includes a metal and an organic linker.

3. The membrane of claim 2, wherein the metal is selected from the group consisting of transition metals, Group 13 metals, and lanthanide metals.

4. The membrane of claim 2, wherein the organic linker includes a heteroaromatic group containing a nitrogen.

5. The membrane of claim 2, wherein the organic linker is an imidazole-based linker or pyrimidine-based linker.

6. The membrane of claim 1, wherein the thin-film membrane is cation-exchanged with $Li^+$, $Na^+$, $K^+$, $Mg^{2+}$, or $Ca^{2+}$.

7. A thin-film membrane comprising a continuous zeolite-like metal-organic framework (ZMOF) thin film intergrown on a substrate, wherein the ZMOF thin film includes a metal selected from the group consisting of transition metals, Group 13 metals, and lanthanide metals, and an organic linker.

8. The membrane of claim 7, wherein the organic linker includes a heteroaromatic group containing a nitrogen.

9. The membrane of claim 7, wherein the organic linker is an imidazole-based linker or pyrimidine-based linker.

10. The membrane of claim 7, wherein the thin-film membrane is cation-exchanged with $Li^+$, $Na^+$, $K^+$, $Mg^{2+}$, or $Ca^{2+}$.

11. The membrane of claim 7, wherein the thin-film membrane has a selectivity for $CO_2$ over one or more of He, $H_2$, $N_2$, $O_2$, $CH_4$, $C_2H_4$, and $C_2H_6$.

12. A method of separating chemical species, comprising:
passing a fluid composition through a thin-film membrane, wherein the thin-film membrane includes a continuous zeolite-like metal-organic framework (ZMOF) thin film intergrown on a substrate.

13. The method of claim 12, wherein the fluid composition includes He, $H_2$, $N_2$, $O_2$, $CO_2$, $CH_4$, $C_2H_4$, $C_2H_6$, or a combination thereof.

14. The method of claim 13, wherein the thin-film membrane has a selectivity for $CO_2$ over one or more of He, $H_2$, $N_2$, $O_2$, $CH_4$, $C_2H_4$, $C_2H_6$.

15. The method of claim 12, wherein the continuous ZMOF thin film has a sodalite topology.

16. The method of claim 12, wherein the continuous ZMOF thin film includes a metal and an organic linker.

17. The method of claim 16, wherein the metal is selected from the group consisting of transition metals, Group 13 metals, and lanthanide metals.

18. The method of claim 16, wherein the organic linker includes a heteroaromatic group containing a nitrogen.

19. The method of claim 16, wherein the organic linker is an imidazole-based linker or pyrimidine-based linker.

20. The method of claim 12, wherein the thin-film membrane is cation-exchanged with $Li^+$, $Na^+$, $K^+$, $Mg^{2+}$, or $Ca^{2+}$.

* * * * *